(12) United States Patent
Suga et al.

(10) Patent No.: US 8,693,443 B2
(45) Date of Patent: Apr. 8, 2014

(54) METHOD FOR ALLOCATING WIRELESS RESOURCE, BASE STATION, AND MOBILE STATION

(75) Inventors: Junichi Suga, Kawasaki (JP); Naoyuki Saito, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 290 days.

(21) Appl. No.: 12/952,556

(22) Filed: Nov. 23, 2010

(65) Prior Publication Data

US 2011/0064060 A1     Mar. 17, 2011

Related U.S. Application Data

(63) Continuation of application No. PCT/JP2008/061858, filed on Jun. 30, 2008.

(51) Int. Cl.
| | | |
|---|---|---|
| H04W 4/00 | (2009.01) | |
| H04B 7/216 | (2006.01) | |
| H04L 12/46 | (2006.01) | |
| G06F 11/00 | (2006.01) | |
| H04W 74/08 | (2009.01) | |
| H04W 28/26 | (2009.01) | |
| H04W 36/00 | (2009.01) | |
| H04L 1/00 | (2006.01) | |
| H04L 5/00 | (2006.01) | |

(52) U.S. Cl.
CPC .......... *H04W 74/0875* (2013.01); *H04W 28/26* (2013.01); *H04W 36/0055* (2013.01); *H04L 1/0026* (2013.01); *H04L 5/0048* (2013.01)
USPC ........... 370/335; 370/295; 370/331; 370/342; 370/345; 370/375; 714/799

(58) Field of Classification Search
CPC ............... H04B 7/2606; H04W 16/26; H04W 36/0055; H04W 74/0875; H04W 84/005; H04W 28/26; H04W 36/0066; H04W 56/0075; H04L 1/0026; H04L 1/0029; H03M 13/3994; H03M 13/4107; H03M 13/6544; H04J 13/0048; H04J 13/18
USPC .................................................. 370/328–356
See application file for complete search history.

(56) References Cited

U.S. PATENT DOCUMENTS 6,879,600 B1 * 4/2005 Jones et al. ................... 370/466
7,103,333 B2 * 9/2006 Lazaridis et al. .......... 455/412.1
(Continued)

FOREIGN PATENT DOCUMENTS

| JP | 6069859 | 3/1994 |
|---|---|---|
| JP | 2003018091 A | 1/2003 |

(Continued)

OTHER PUBLICATIONS

International Search Report dated Jul. 22, 2008, in corresponding International application No. PCT/JP2008/061858.

(Continued)

*Primary Examiner* — Ayaz Sheikh
*Assistant Examiner* — Venkatesh Haliyur
(74) *Attorney, Agent, or Firm* — Smith, Gambrell & Russell, LLP

(57) ABSTRACT

A base station allocates, when receiving a first code included in a predetermined code group from a first mobile station, a wireless resource in a first communication region corresponding to the first code, to the first mobile station, and allocates, when receiving a second code not included in the predetermined code group from a second mobile station, a wireless resource in a second communication region corresponding to the second code, to the second mobile station.

9 Claims, 43 Drawing Sheets

(56) References Cited

U.S. PATENT DOCUMENTS

| | | | |
|---|---|---|---|
| 7,324,830 B2 * | 1/2008 | Lazaridis et al. | 455/550.1 |
| 7,796,704 B2 * | 9/2010 | Hara et al. | 375/295 |
| 7,917,126 B2 * | 3/2011 | Lazaridis et al. | 455/412.1 |
| 7,920,860 B2 * | 4/2011 | Chari et al. | 455/431 |
| 8,059,603 B2 * | 11/2011 | Jin | 370/331 |
| 8,064,424 B2 * | 11/2011 | Sambhwani et al. | 370/342 |
| 8,134,982 B2 * | 3/2012 | Lee et al. | 370/335 |
| 8,145,208 B2 * | 3/2012 | Chari et al. | 455/431 |
| 8,259,688 B2 * | 9/2012 | Bourlas et al. | 370/335 |
| 8,311,011 B2 * | 11/2012 | Kim et al. | 370/331 |
| 8,392,811 B2 * | 3/2013 | Lee et al. | 714/799 |
| 8,503,404 B2 * | 8/2013 | Kim et al. | 370/335 |
| 2006/0251012 A1 | 11/2006 | Hara et al. | 370/328 |
| 2006/0252415 A1 * | 11/2006 | Lazaridis et al. | 455/415 |
| 2007/0019535 A1 * | 1/2007 | Sambhwani et al. | 370/203 |
| 2007/0177494 A1 | 8/2007 | Tomizawa | |
| 2008/0056193 A1 * | 3/2008 | Bourlas et al. | 370/331 |
| 2008/0102801 A1 * | 5/2008 | Lazaridis et al. | 455/414.1 |
| 2008/0102812 A1 * | 5/2008 | Chari et al. | 455/424 |
| 2008/0102813 A1 * | 5/2008 | Chari et al. | 455/424 |
| 2008/0102814 A1 * | 5/2008 | Chari et al. | 455/424 |
| 2009/0067404 A1 * | 3/2009 | Lee et al. | 370/345 |
| 2009/0097449 A1 * | 4/2009 | Jin | 370/331 |
| 2009/0098882 A1 * | 4/2009 | Yoon | 455/456.1 |
| 2009/0098888 A1 * | 4/2009 | Yoon | 455/456.2 |
| 2009/0177951 A1 * | 7/2009 | Lee et al. | 714/799 |
| 2009/0316676 A1 * | 12/2009 | Kolding et al. | 370/345 |
| 2009/0323634 A1 * | 12/2009 | Kim et al. | 370/331 |
| 2010/0046446 A1 | 2/2010 | Tanigawa et al. | |
| 2010/0222063 A1 * | 9/2010 | Ishikura et al. | 455/450 |
| 2011/0064060 A1 * | 3/2011 | Suga et al. | 370/335 |

FOREIGN PATENT DOCUMENTS

| | | |
|---|---|---|
| JP | 2005502218 | 1/2005 |
| JP | 2007208484 | 8/2007 |
| JP | 200872285 | 3/2008 |
| WO | 0249305 A2 | 6/2002 |

OTHER PUBLICATIONS

Mobile WiMAX-Part 1 "A Technical Overview and Performance Evaluation" Aug. 2006.

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 IEEE Std 802.16e-2005 and IEEE Std 802.16-2004/Cor1-2005, Feb. 28, 2006.

IEEE 802.16m System Requirement date submitted Oct. 19, 2007.

Mark Cudak, Kevin Baum, Anup Talukdar, Amitava Ghosh, Fan Wang, Implications of Backwards Compatibility on IEEE 802.16m Frame Structure, IEEE C802.16m-07/265, IEEE 802.16 Task Group dated Nov. 7, 2007.

Sungcheol Chang, Juhee Kim, Chulsik Yoon, CDMA Code Partitioning for R-UL Ranging Control, IEEE C802.16j-06/128, IEEE C802.16's Relay Task Group dated Jan. 8, 2007.

Notification of Reasons for Refusal Japanese Patent Office Action dated Apr. 10, 2012 in relation to Japanese Patent Application No. 2010-518840.

* cited by examiner

FIG. 3

| UL-MAP IE | | |
|---|---|---|
| Syntax | Size(bit) | Notes |
| CID | 16 | |
| UIUC | 4 | 12: CDMA Contention Region |

| CDMA ranging | | |
|---|---|---|
| Syntax | Size(bit) | Notes |
| OFDMA Symbol offset | 8 | |
| Subchannel offset | 7 | |
| No. OFDMA Symbols | 7 | |
| No. Subchannels | 7 | |
| Ranging Method | 2 | 0b00: Initial ranging over two symbols<br>0b01: Initial ranging over four symbols<br>0b10: BR/periodic ranging over one symbol<br>0b11: BR/periodic ranging over three symbols |
| Dedicated ranging indicator | 1 | 0 |

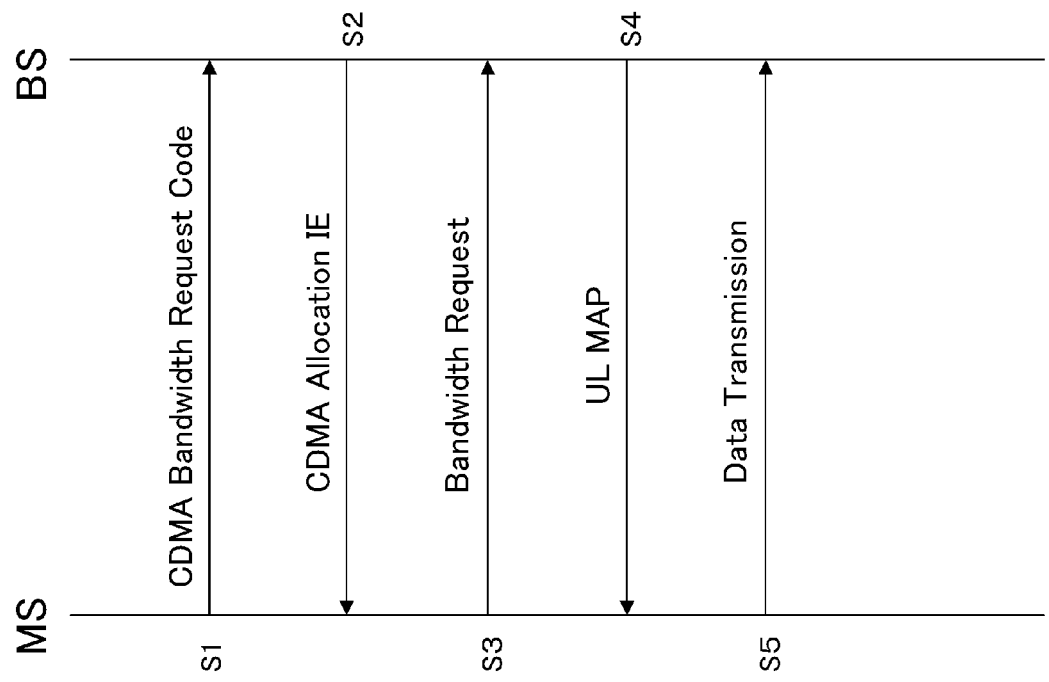

FIG. 5

| UL-MAP IE | | |
|---|---|---|
| Syntax | Size(bit) | Notes |
| CID | 16 | |
| UIUC | 4 | 14: CDMA Allocation IE |
| CDMA Allocation IE | | |
| Syntax | Size(bit) | Notes |
| Duration | 6 | |
| UIUC | 4 | |
| Repetition Coding Information | 4 | 0b00: No repetition coding<br>0b01: Repetition coding of 2 used<br>0b10: Repetition coding of 4 used<br>0b11: Repetition coding of 6 used |
| Frame Number Index | 4 | |
| Ranging Code | 7 | |
| Ranging Symbol | 8 | |
| Ranging Subchannel | 8 | |
| Bandwidth Request Mandatory | 1 | |

FIG. 12

| Parameter | Definition |
|---|---|
| Start of ranging codes group (S) | Start value of range of ranging codes used |
| Initial ranging codes (N) | Initial ranging code count for 802.16e region |
| Periodic ranging codes (M) | Periodic ranging code count for 802.16e region |
| Bandwidth request codes (L) | Bandwidth request code count for 802.16e region |
| Handover ranging codes (O) | Handover ranging code count for 802.16e region |
| Initial ranging codes (N_16m) | Initial ranging code count for 802.16m region |
| Periodic ranging codes (M_16m) | Periodic ranging code count for 802.16m region |
| Bandwidth request codes (L_16m) | Bandwidth request code count for 802.16m region |
| Handover ranging codes (O_16m) | Handover ranging code count for 802.16m region |

FIG. 21

| Parameter | Definition |
|---|---|
| Start of ranging codes group (S) | Start value of range of ranging codes used |
| Initial ranging codes (N) | Initial ranging code count for R3 Zone region |
| Periodic ranging codes (M) | Periodic ranging code count for R3 Zone region |
| Bandwidth request codes (L) | Bandwidth request code count for R3 Zone region |
| Handover ranging codes (O) | Handover ranging code count for R3 Zone region |
| Initial ranging codes (N_R1) | Initial ranging code count for R1 Zone region |
| Periodic ranging codes (M_R1) | Periodic ranging code count for R1 Zone region |
| Bandwidth request codes (L_R1) | Bandwidth request code count for R1 Zone region |
| Handover ranging codes (O_R1) | Handover ranging code count for R1 Zone region |

FIG. 30

| UL-MAP IE | | | |
|---|---|---|---|
| | Syntax | Size(bit) | Notes |
| | CID | 16 | Broadcast |
| | UIUC | 4 | |
| | Zone Interference and Noise IE | | |
| | Syntax | Size(bit) | Notes |
| | R3 Zone NI | 8 | Values of noise and interference in R3 Zone |
| | R1 Zone NI | 8 | Values of noise and interference in R1 Zone |

FIG. 33

| Parameter | Definition |
|---|---|
| Start of ranging codes group (S) | Start value of range of ranging codes used |
| Initial ranging codes (N) | Initial ranging code count |
| Periodic ranging codes (M) | Periodic ranging code count |
| Bandwidth request codes (L) | Bandwidth request code count |
| Handover ranging codes (O) | Handover ranging code count |

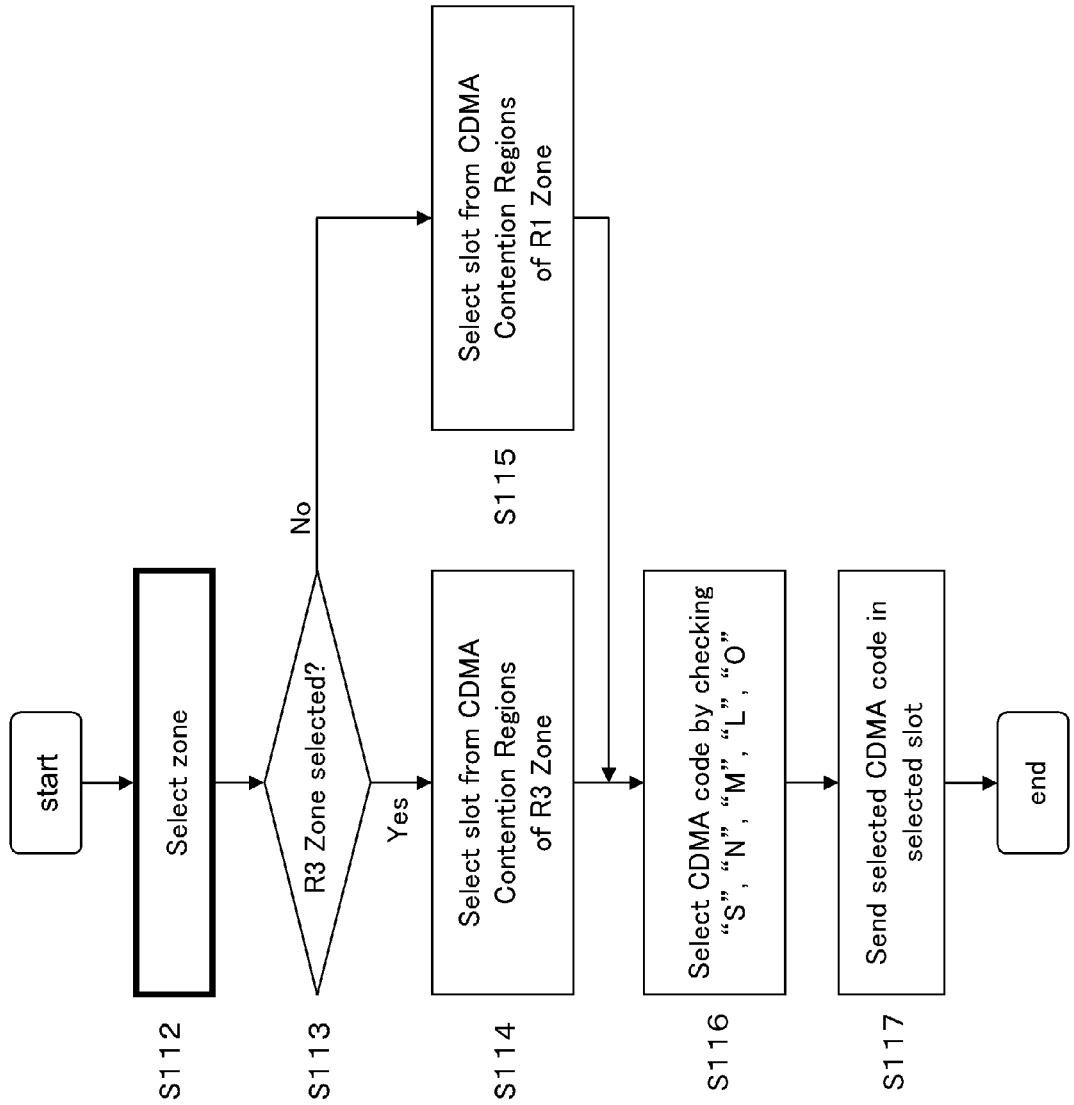

METHOD FOR ALLOCATING WIRELESS RESOURCE, BASE STATION, AND MOBILE STATION

CROSS-REFERENCE TO RELATED APPLICATION

This application is a continuation Application of a PCT international application No. PCT/JP2008/061858 filed on Jun. 30, 2008 in Japan, the entire contents of which are incorporated by reference.

FIELD

The embodiments discussed herein are related to a method for allocating a wireless resource, a base station, and a mobile station in a wireless communication.

BACKGROUND

The IEEE (Institute of Electrical and Electronic Engineers) 802.16WG (Working Group) has proposed a point-to-multipoint (P-MP) communication system wherein a plurality of mobile stations (MSs) can be connected to a base station (BS). For example, a concept of a communication system according to the 802.16d and 802.16e standards is illustrated in FIG. 1 as an example of a P-MP communication system.

FIG. 2 is an example of the frame structure according to 802.16d/e, illustrating a DL (downlink) sub-frame and a UL (uplink) sub-frame.

In FIG. 2, the preamble signal ("Preamble") at the start of the DL sub-frame is a synchronization signal sent from a base station to mobile stations, and the mobile stations synchronize with the base station in response to receiving this preamble signal.

The "DL-MAP" and "UL-MAP" contain information on the frame structures, control information, and the like for the DL and UL sub-frames, respectively. The mobile stations perform DL reception processing and UL transmission processing by making reference to the DL-MAP and the UL-MAP, respectively.

The "CDMA (Code Division Multiple Access) Contention Region" defined in the UL sub-frame is a region used for sending a Ranging Code for adjusting a transmission power and timing at a mobile station, and a Bandwidth Request Code for requesting allocation of a UL communication region for sending a bandwidth request, from a mobile station to a base station.

Such a CDMA Contention Region is a contention region in which any mobile station can send a CDMA code, without being specified by a base station. In preparation for sending a CDMA code, each mobile station selects a slot from this CDMA Contention Region on which the CDMA code is to be sent.

In this particular example, there are 256 patterns of CDMA codes, and the ranges of the patterns are defined depending on information to be sent. For example, if a mobile station sends a CDMA code for a bandwidth request, the mobile station selects one CDMA code from the CDMA code pattern ranges for bandwidth requests, and sends the selected one to the base station.

FIG. 3 illustrates one example of a UL MAP information element (IE) broadcasted to mobile stations when a base station sets a CDMA Contention Region to a UL sub-frame.

In FIG. 3, the "CID (ConnectionIdentifier)" is an identifier for a connection, which is set by the base station for all mobile stations for broadcasting.

The "UIUC (Uplink Interval Usage code)" indicates the type of the UL MAP IE, using which the type of UL MAP IE can be identifiable. For example, the value "12" is set for the CDMA Contention Region.

In addition, the location of the CDMA Contention Region within the UL sub-frame is specified in the "OFDMA Symbol offset", "Subchannel offset", "No. OFDMA Symbols", and "No. Subchannels", and the purpose of the CDMA Contention Region is specified in the "Ranging Method".

For example, the purposes of a CDMA Contention Region that can be specified in "Ranging Method" include Initial Ranging, Handover Ranging, Periodic Ranging, and Bandwidth Request.

FIG. 4 depicts an example of the sequence when a mobile station requests allocation of a communication region to a base station.

In S1, the mobile station selects one CDMA code from pattern ranges divided for the purpose of Bandwidth Request, and sends the selected one to the base station.

In response to receiving the CDMA code from the mobile station in S1, in S2, the base station sends a CDMA allocation IE to the mobile station, thereby specifying a communication region in the UL sub-frame which the mobile station uses for sending a Bandwidth Request message. Since the base station does not know which mobile station has sent the CDMA code received by the base station, the base station also sends the location of the received CDMA code in the CDMA Contention Region and information on that code pattern.

In S3, the mobile station sends a Bandwidth Request message to the base station in the communication region in the UL sub-frame specified in the CDMA Allocation IE received from the base station in S2. The Bandwidth Request message contains information on the data size of the data the mobile station intends to send.

In S4, the base station allocates a communication region in the UL sub-frame, based on the data size specified in the Bandwidth Request message received from the mobile station in S3, and specifies it in a UL-MAP.

In S5, the mobile station sends data in the communication region in the UL sub-frame specified in the UL-MAP received from the base station in S4.

An example of a UL-MAP IE containing a CDMA allocation IE which is sent from the base station to the mobile station in FIG. 4 is illustrated in FIG. 5.

In FIG. 5, the "Duration" specifies the number of slot(s) allocated to the mobile station by the base station.

The "UIUC" specifies the Burst Profile which is information on modulation and coding used for sending a Bandwidth Request message and the like, in the communication region specified in the CDMA allocation IE.

The "RepetitionCodingInformation" specifies information on the Repetition Code.

The "FrameNumberIndex", "RangingCode", "RangingSymbol", and "Ranging Subchannel" specify information on the CDMA code received by the base station. The mobile station which has sent the CDMA code having the pattern indicated in the "Ranging Code" at the location of the "Ranging Symbol" and "Ranging Subchannel" in the frame indicated by the "Frame Number Index" can be identified.

The "Bandwidth Request Mandatory" specifies whether sending a Bandwidth Request message is mandatory or not.

As described above, if a mobile station sends a CDMA code in the CDMA Contention Region, the base station does not know which mobile station has send the CDMA code from that code received by base station. The base station thus specifies the mobile station which has send the CDMA code by including information on the received CDMA code and the location information within the frame in a CDMA allocation IE and sends the CDMA allocation IE. In response to receiving the CDMA allocation IE, the mobile station sends a message to the base station using a communication region in the UL sub-frame specified in the received CDMA allocation IE.

The 802.16m standard, which is the next version of 802.16e, is expected to be able to support not only mobile stations compliant with 802.16m (hereinafter referred to as "802.16m-compliant mobile stations"), but mobile stations compliant with 802.16e (hereinafter referred to as "802.16e-compliant mobile stations").

An example of an 802.16m frame structure supporting both 802.16e-compliant and 802.16m-compliant mobile stations is illustrated in FIG. 6.

As depicted in FIG. 6, the 802.16m frame includes a region for communications between a base station and 802.16e-compliant mobile stations (hereinafter, referred to as an "802.16e communication region") and a region for communications between the base station and 802.16m-compliant mobile stations (hereinafter, referred to as an "802.16m communication region"). Such 802.16m-compliant mobile stations are also capable of operating as 802.16e-compliant mobile stations, and making communications in the communication region for 802.16e-compliant mobile stations.

In the meantime, the WiMAX (Worldwide interoperability for Microwave Access) Forum has proposed the Fractional Frequency Reuse (FFR), as one use of frequency bands in a wireless communication system based on the 802.16 standards.

An example of the wireless frame structure used in an FFR-implementing communication system is illustrated in FIG. 7.

In FIG. 7, two time domains, R1 Zone and R3 Zone, are defined in a frame allocated to base stations BS1-BS3.

In the R1 Zone, a common frequency band is allocated to base stations BS1-BS3, while different frequency bands are allocated for the respective base stations in the R3 Zone. For example, one or more of frequency bands f1-f3 is allocated to the BS1-BS3 in the R1 Zone (the same frequency band may be allocated to the adjacent base stations), and different frequency bands are allocated in the R3 Zone, e.g., f1 is allocated to the BS1, and f2 to the BS2.

Here, it is assumed that the R1 Zone is allocated to a mobile station having a relatively better wireless quality with the base station, e.g., a mobile station located in the vicinity of the base station, while the R3 Zone is allocated to a mobile station having a relatively poor wireless quality with the base station, e.g., a mobile station located in the edge of the communication area serviced by the base station. In such a case, improved throughput and better coverage can be both assured.

As described above, in an 802.16m system and an FFR-implementing system, multiple communication regions are present in a certain frame, and a mobile station communicates with a base station in a communication region that is suited in view of the wireless specification, the wireless conditions and the performance of that mobile station, and the like.

Non-patent Document 1: IEEE Std 802.16TM-2004 Non-patent Document 2: IEEE Std 802.16eTM-2005 Non-patent Document 3: IEEE 802.16m System Requirements Non-patent Document 4: Mobile WiMAX—Part I: A Technical Overview and Performance Evaluation (August, 2006)

Even in the case of an 802.16m system and an FFR-implementing system as described previously, for example, a mobile station has to send a CDMA code to a base station for requesting allocation of a communication region to be used for sending a Bandwidth Request message.

As described above, upon receiving the CDMA code, the base station may not be able to, however, know which mobile station sends that CDMA code.

Thus, in the 802.16m system, since the base station does not know whether the mobile station sending the CDMA code is an 802.16e-compliant mobile station or an 802.16m-compliant terminal, for example, the base station has to allocate an 802.16e communication region to the mobile station which can be used by both 802.16e-compliant and 802.16m-compliant mobile stations.

However, the requesting 802.16m-compliant mobile station can communicate in an 802.16m region, accordingly, allocation in this manner may consume more 802.16e communication region resources, making allocation inefficient.

In contrast, similarly in an FFR system, a base station does not know whether a mobile station sending a CDMA code is a mobile station communicating in a communication region in the R1 Zone or a mobile station communicating in a communication region in the R3 Zone.

Accordingly, the base station have to allocate a communication region in the R3 Zone which can be used by both mobile stations communicating in an R1 Zone and an R3 Zone. Allocation in this manner may also consume more R3 Zone resources since a communication region in the R3 Zone is allocated to a mobile station communicating in an R1 Zone, also making allocation inefficient.

Note that an 802.16m system and an FFR-implementing system are merely non-limiting examples of communication systems to which the present disclosure is applicable.

SUMMARY

According to an aspect of the embodiments, a method includes a method for allocating a wireless resource, including: allocating, when receiving a first code included in a predetermined code group from a first mobile station, a wireless resource in a first communication region corresponding to the first code, to the first mobile station, and allocating, when receiving a second code not included in the predetermined code group from a second mobile station, a wireless resource in a second communication region corresponding to the second code, to the second mobile station.

According to an aspect of the embodiments, a method includes a method for allocating a wireless resource, including: allocating, when a received code is a code received in a first communication region, a wireless resource in a second communication region corresponding to the first communication region, to a mobile station that sends the received code, and allocating, when the received code is a code received in a third communication region, a wireless resource in a fourth communication region corresponding to the third communication region, to the mobile station that sends the received code.

According to an aspect of the embodiments, an apparatus includes a base station including: a reception section that receives a code; and a control section that controls to: allocate, when receiving a first code included in a predetermined code group by the reception section from a first mobile station, a wireless resource in a first communication region corresponding to the first code, to the first mobile station, and allocate, when receiving a second code not included in the predetermined code group by the reception section from a second mobile station, a wireless resource in a second communication region corresponding to the second code, to the second mobile station.

According to an aspect of the embodiments, an apparatus includes a base station including: a reception section that receives a code; and a control section that controls to: allocate, when receiving a first code included in a predetermined code group by the reception section from a first mobile station, a wireless resource in a first communication region corresponding to the first code, to the first mobile station, and allocate, when receiving a second code not included in the predetermined code group by the reception section from a second mobile station, a wireless resource in a second communication region corresponding to the second code, to the second mobile station.

According to an aspect of the embodiments, an apparatus includes a base station including: a reception section that receives a code; and a control section that controls to: allocate, when a received code is a code received by the reception section in a first communication region, a wireless resource in a second communication region corresponding to the first communication region, to a mobile station that sends the received code, and allocate, when the received code is a code received by the reception section in a third communication region, a wireless resource in a fourth communication region corresponding to the third communication region, to the mobile station that sends the received code.

According to an aspect of the embodiments, an apparatus includes a mobile station including: a transmission section that sends, to a base station, a code selected from a predetermined code group; a reception section that receives, from the base station, allocation information of a wireless resource in a communication region corresponding to a type of the code, of a plurality of communication regions; and a control section that controls the transmission section in accordance with the allocation information for transmitting a wireless signal using the wireless resource.

According to an aspect of the embodiments, an apparatus includes a mobile station including: a transmission section that sends a code to a base station; a reception section that receives, from the base station, allocation information of a wireless resource in a communication region corresponding to a communication region in which the code is sent, of a plurality of communication regions; and a control section that controls the transmission section in accordance with the allocation information for transmitting a wireless signal using the wireless resource.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 is a diagram illustrating an example of a UL MAP IE;

FIG. 4 is a sequence diagram when a mobile station requests allocation of a communication region to a base station;

FIG. 5 is a diagram illustrating an example of a UL-MAP IE including a CDMA Allocation IE;

FIG. 12 is a diagram illustrating an example of a UCD message in the first embodiment;

FIG. 21 is a diagram illustrating an example of a UCD message in the variant of the first embodiment;

FIG. 30 is a diagram illustrating an example of a UL-MAP IE including information on the interference value;

FIG. 33 is a diagram illustrating an example of a UCD message in the second embodiment;

FIG. 43 is a flowchart illustrating an example of a processing flow when a mobile station sends a CDMA code in the variant of the second embodiment.

DESCRIPTION OF EMBODIMENTS

Hereafter, various embodiments of the present invention will be described with reference to the drawings.

Although an 802.16m system or FFR-implementing system as described above will be explained as examples of communication systems to which an embodiment are applied, this is not limiting. For example, any of embodiments can be applied to other communication systems wherein a base station allocates wireless resources to mobile stations having different capacities or in different wireless environments or the like.

(1) Summary of Embodiments (a) Example of Frame Structure

Figure 1:
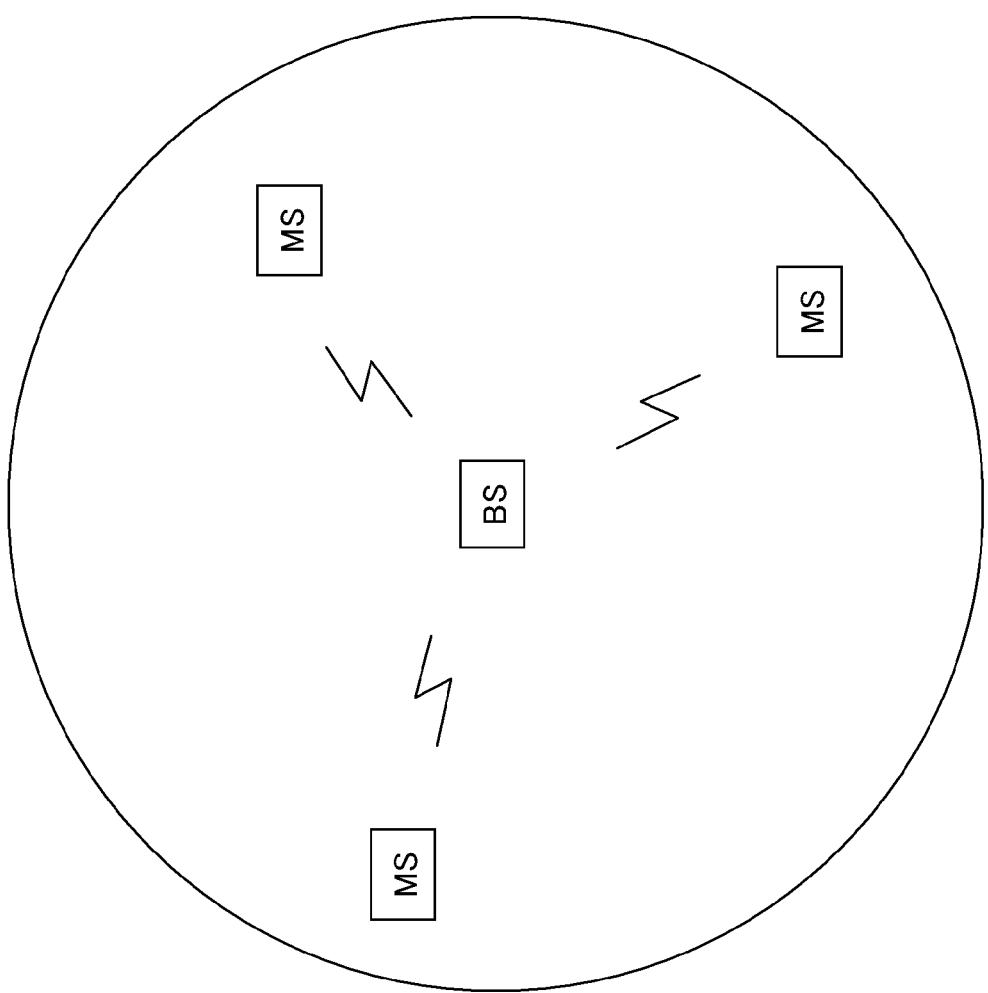
FIG. 1 is a conceptual diagram of a P-MP communication system.
Figure 2:
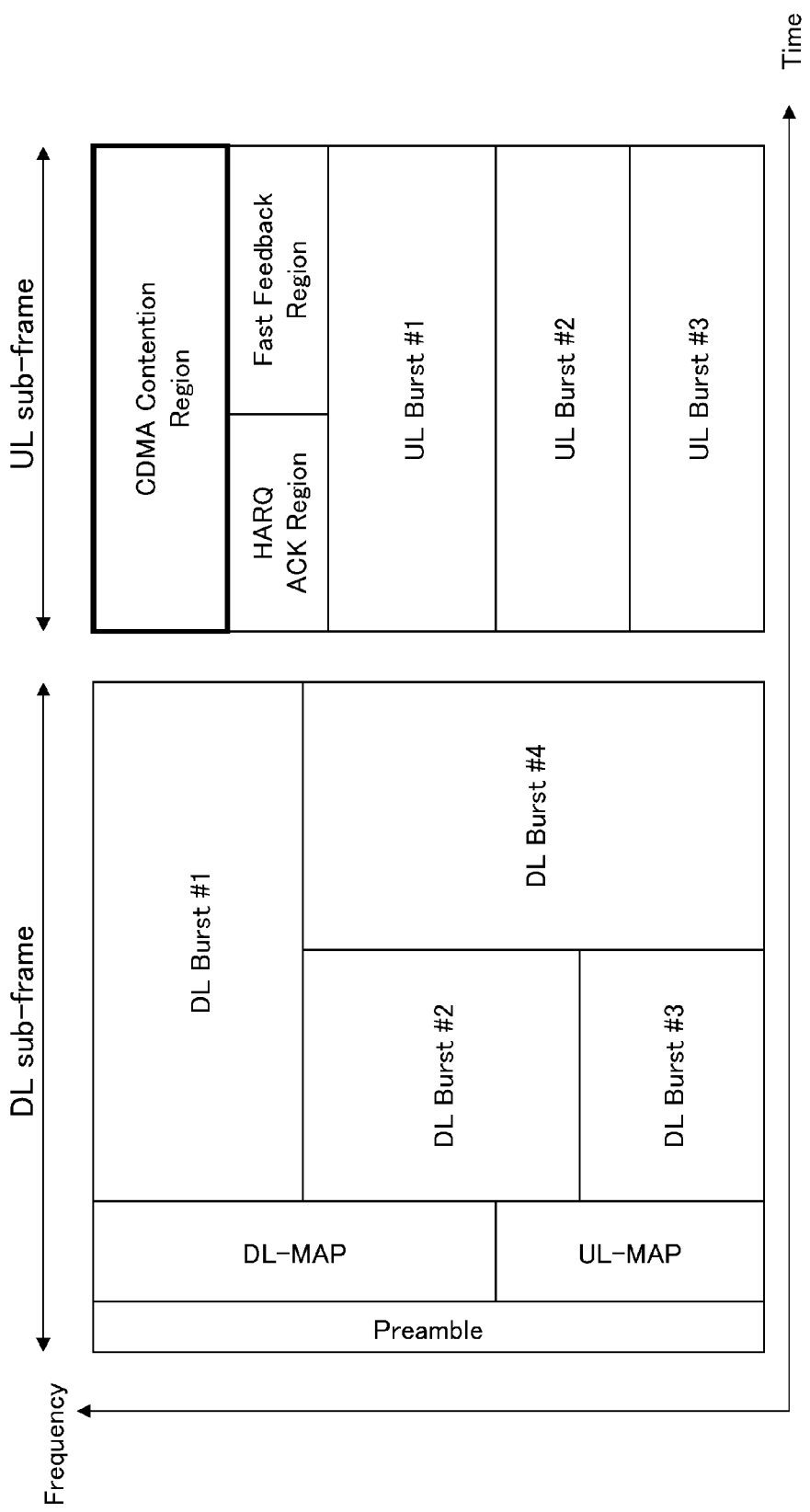
FIG. 2 is a diagram illustrating an example of the frame structure in accordance with the 802.16d/e standards.
Figure 6:
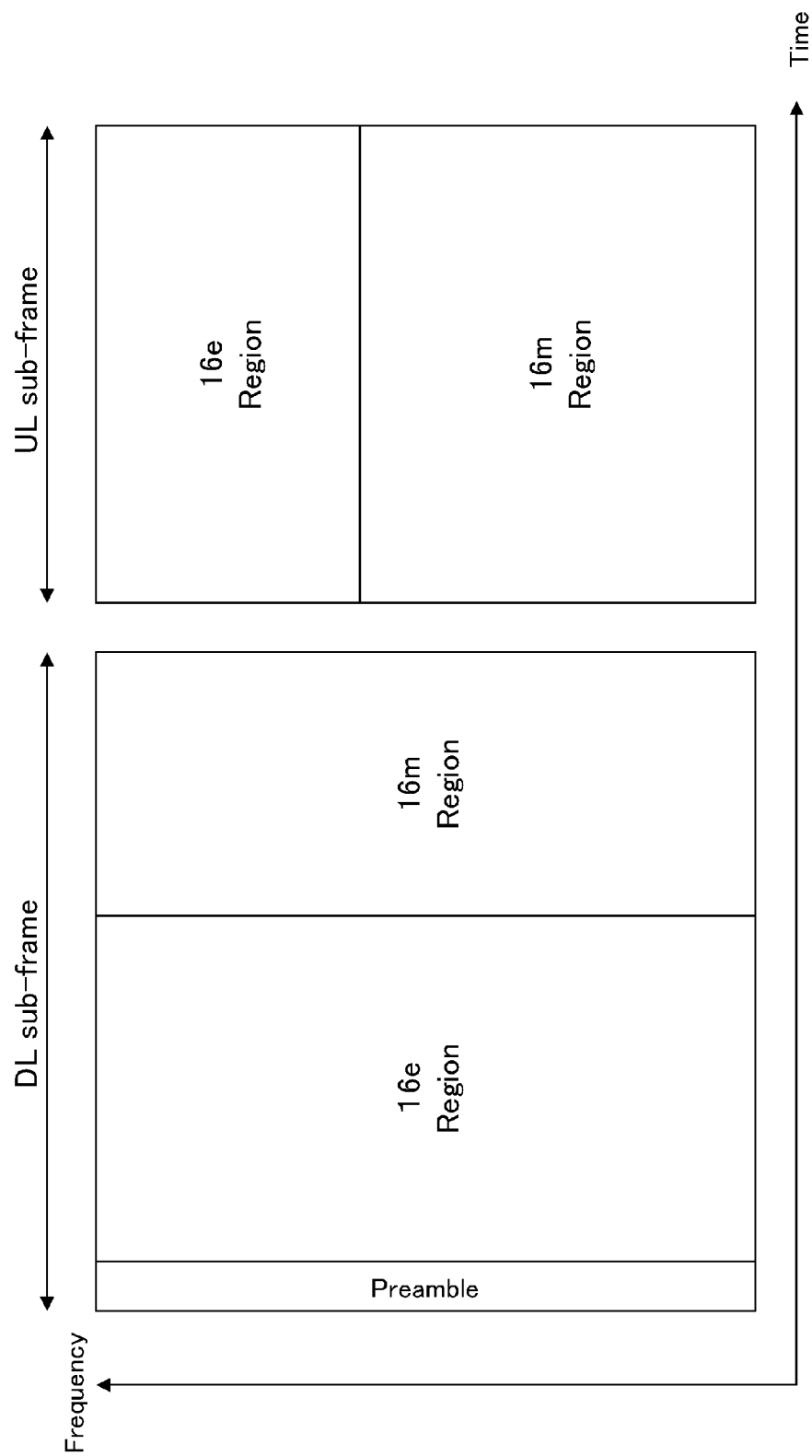
FIG. 6 is a diagram illustrating an example of the frame structure used in an 802.16m system.
Figure 7:
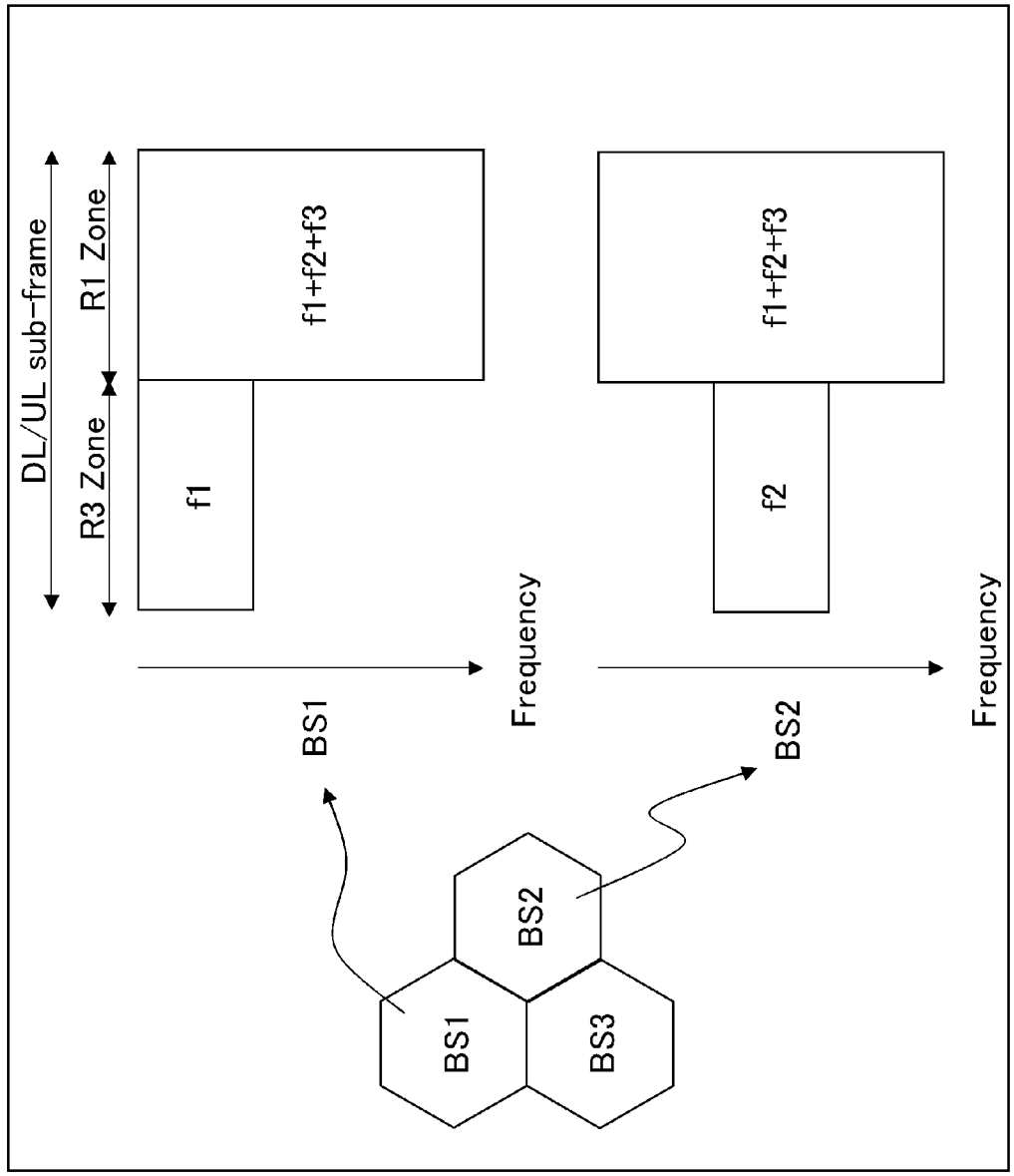
FIG. 7 is a diagram illustrating an example of a frame structure used in an FFR-implementing communication system.
Figure 8:
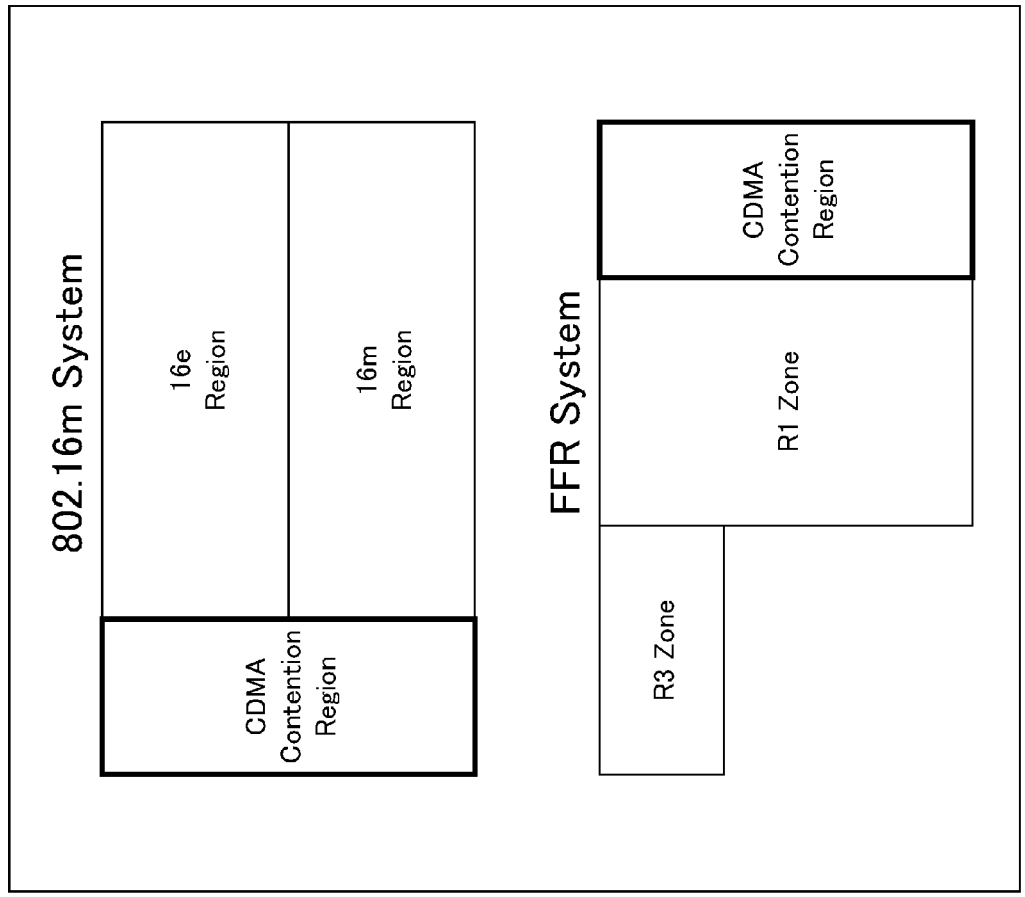
FIG. 8 is a diagram illustrating an example of a UL subframe structure used in embodiments.

An example of a UL sub-frame of a wireless frame used in various embodiments is illustrated in FIG. 8. In FIG. 8, the upper section illustrates a UL sub-frame in an 802.16m system, and the lower section illustrates a UL sub-frame in an FFR-implementing system.

The UL sub-frame in the 802.16m system includes an 802.16e communication region for communications between a base station and 802.16e-compliant mobile stations, an 802.16m communication region for communications between the base station and 802.16m-compliant mobile stations, and the region of a CDMA Contention Region. Since the 802.16m-compliant mobile stations are capable of operating as 802.16e-compliant mobile stations, they can also communicate in the 802.16e communication region.

The UL sub-frame of the FFR-implementing system includes an R1 Zone for allocating a frequency band that is common among adjacent base stations, an R3 Zone for allocating different frequency bands to the respective adjacent base stations, and a region of the CDMA Contention Region. A mobile station to which the R1 Zone is allocated can also communicate in the R3 Zone.

In either of the systems, the CDMA Contention Regions are communication regions common to multiple mobile stations, wherein each mobile station selects a CDMA code from predetermined signal patterns and sends the selected code. This selection may be made using predetermined selection criteria, such as random numbers.

(b) Base Station

Figure 9:
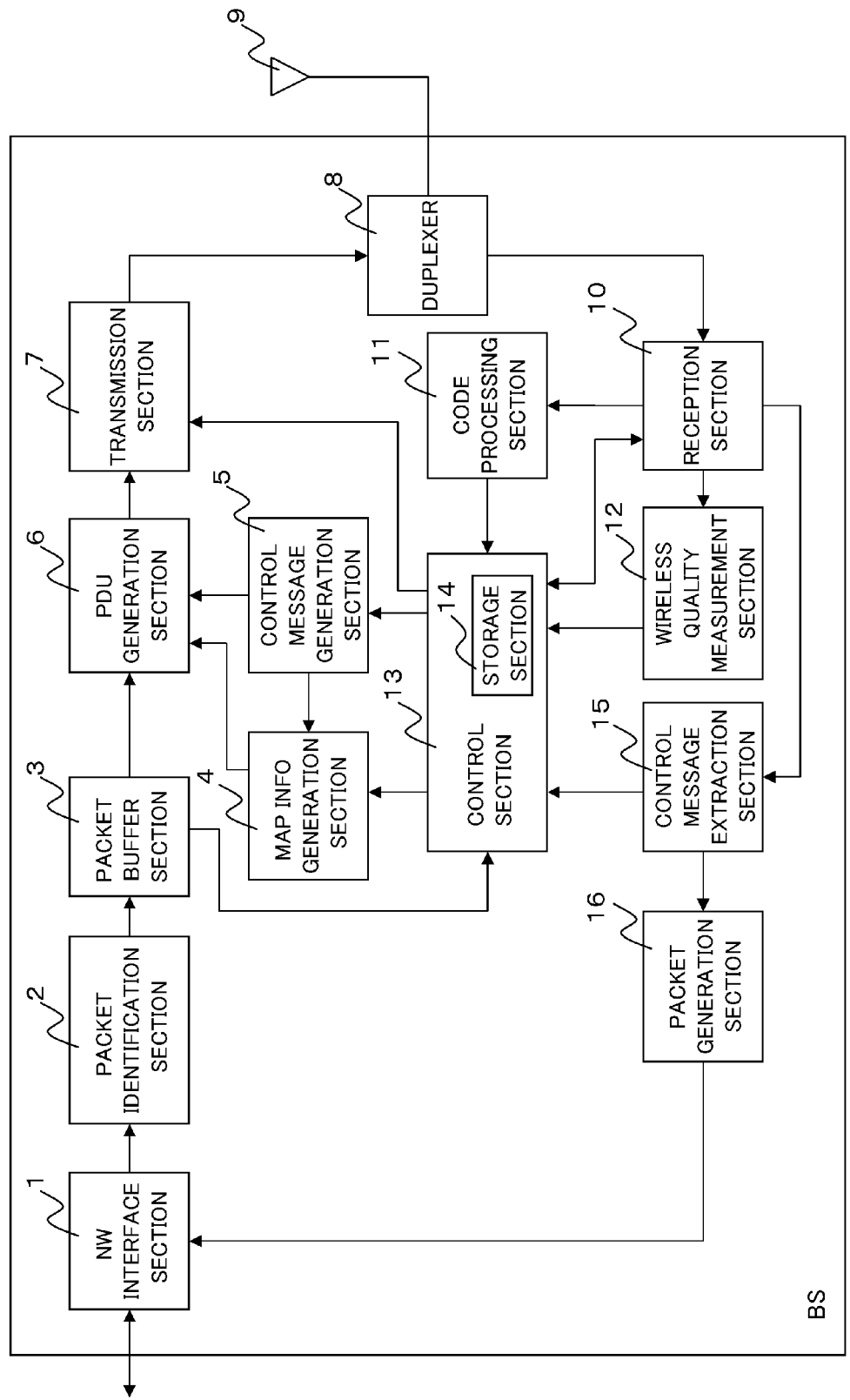
FIG. 9 is a diagram illustrating an example of the configuration of a base station used in the embodiments.

FIG. 9 illustrates an example of the configuration of a base station used in the embodiments.

In FIG. 9, reference numeral 1 denotes an NW (network) interface section, 2 denotes a packet identification section, 3 denotes a packet buffer section, 4 denotes a MAP information generation section, 5 denotes a control message generation section, 6 denotes a PDU (Protocol Data Unit) generation section, 7 denotes a transmission section, 8 denotes a duplexer, 9 denotes an antenna, 10 denotes a reception section, 11 denotes a code processing section, 12 denotes a wireless quality measurement section, 13 denotes a control section, 14 denotes a storage section, 15 denotes a control message extraction section, and 16 denotes a packet generation section.

The NW interface section 1 is an interface with the upper-level network.

The packet identification section 2 identifies a packet received via the upper-level network, and stores that packet in an appropriate location in the packet buffer section 3.

The packet buffer section 3 stores and maintains the packet identified by the packet identification section 2.

The MAP information generation section 4 generates a DL-MAP IE and a UL-MAP IE (MAP information) which are information defining the wireless frame structure. The base station controls communications to mobile stations using such MAP information.

The MAP information generation section 4 makes settings on a CDMA Contention Region.

The control message generation section 5 generates a control message to be sent to a mobile station. The base station controls communications to the mobile station using that control message. The control message generation section 5 also makes settings on the CDMA Code patterns.

The PDU generation section 6 generates a PDU (protocol data unit) to be sent in the wireless frame using the control message, using the packet stored in the packet buffer section 3, the MAP information generated by the MAP information generation section 4, and the control message generated by the control message generation section 5.

The transmission section 7 executes encoding and modulation on the data generated by the PDU generation section 6.

The duplexer 8 switches between signal transmission and reception using a filter.

The antenna 9 transmits and receives signals to and from mobile stations.

Although a single antenna 9 and the duplexer 8 are provided in FIG. 9, separate antennas having respective filters may be provided for signal transmission and reception.

The reception section 10 executes demodulation and decoding on a received signal. The reception section 10 also routes a control signal (e.g., as a CDMA code, an ACK/NACK code) in the received signal to the code processing section 11, and routes data signal to the control message extraction section 15.

The code processing section 11 identifies information (such as the control type) based on the code contained in the control signal processed by the reception section 10, and sends the identified information to the control section 13.

The wireless quality measurement section 12 measures the quality of the signal processed by the reception section 10, and measures interference among signals received during a UL period.

The control section 13 executes scheduling, based on the packet occupancy status of the packet buffer section 3 and control information (control signal or control message) received from the mobile station, and controls generation of MAP information in the MAP information generation section 4 and generation of a control message in the control message generation section 5.

The storage section 14 stores information on the CDMA code pattern ranges defined in a UCD (Uplink Channel Descriptor) message, which will be described later. The storage section 14 also stores the measurement results on received signals measured by the wireless quality measurement section 26. Note that the storage section 14 may be incorporated in the control section 13, or may be provided separately.

The control message extraction section 15 extracts a control message contained in the data signal processed by the reception section 10, and sends information on the control message to the control section 13.

The packet generation section 16 receives the data signal from the control message extraction section 15, and generates a packet to be sent to the upper-level network using data included in the data signal. The packet generation section 16 transfers the generated packet to the NW interface section 1.

(c) Mobile Station

Figure 10:
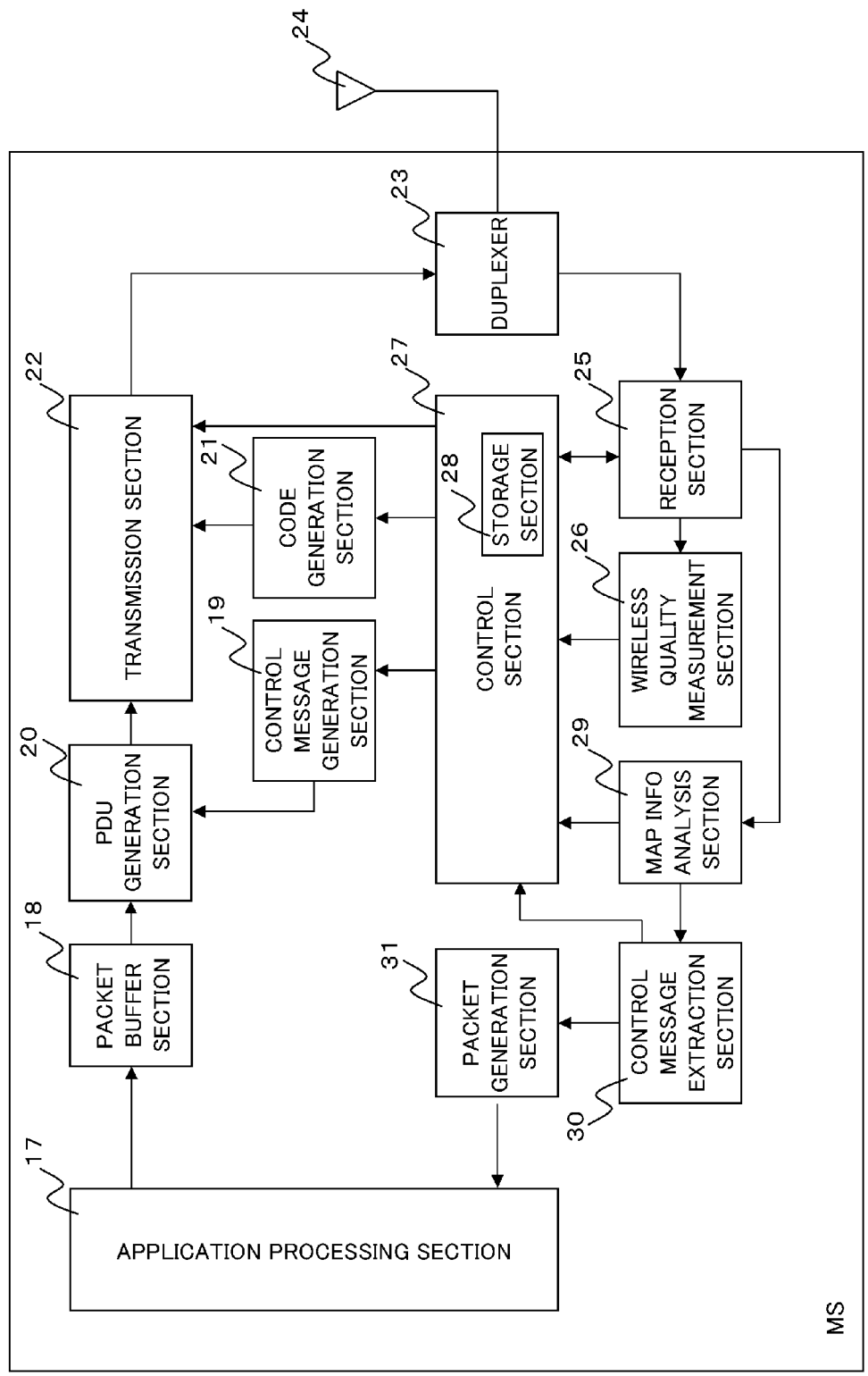
FIG. 10 is a diagram illustrating an example of the configuration of a mobile station used in the embodiments.

FIG. 10 illustrates an example of the configuration of a mobile station used in the embodiments.

In FIG. 10, reference numeral 17 denotes an application processing section, 18 denotes a packet buffer section, 19 denotes a control message generation section, 20 denotes a PDU generation section, 21 denotes a code generation section, 22 denotes a transmission section, 23 denotes a duplexer, 24 denotes an antenna, 25 denotes a reception section, 26 denotes a wireless quality measurement section, 27 denotes a control section, 28 denotes a storage section, 29 denotes an MAP information analysis section, 30 denotes a control message extraction section, and 31 denotes a packet generation section.

The application processing section 17 executes processing on transmission data or reception data on the upper-layer (e.g., display data on a display section, for example).

The packet buffer section 18 stores and maintains packets transferred from the application processing section 17.

The control message generation section 19 generates a control message (such as a Bandwidth Request) to be sent to a mobile station.

The PDU generation section 20 generates a PDU to be sent in a wireless frame using data stored in the packet buffer section 18 or a control message generated by the control message generation section 19.

The code generation section 21 generates codes, such as a CDMA code, an HARQ ACK, a CQI (Channel Quality Indicator).

The transmission section 22 executes encoding and modulation on the data generated by the PDU generation section 20 and the code generated by the code generation section 21.

The duplexer 23 switches between signal transmission and reception using a filter.

The antenna 24 transmits and receives signals to and from the base station.

Although a single antenna 24 and the duplexer 23 are provided in FIG. 10, separate antennas having respective filters may be provided for signal transmission and reception.

The reception section 25 executes demodulation and decoding on a received signal.

The wireless quality measurement section 26 measures the quality of the signal processed by the reception section 25, and measures the signal intensity.

The control section 27 executes scheduling, based on the packet occupancy status of the packet buffer section 18 and control information received from the base station, and controls generation of a control message in the control message generation section 19 and generation of a code in the code generation section 21.

The storage section 28 stores information on the CDMA code pattern range contained in a UCD message sent from the base station. The storage section 14 also stores the measurement results on received signals measured by the wireless quality measurement section 26. Note that the storage section 28 may be incorporated in the control section 27, or may be provided separately.

The MAP information analysis section 29 analyzes MAP information contained in the received a signal processed by the reception section 25. For example, the MAP information analysis section 29 identifies the location of the CDMA Contention Region within the UL sub-frame based on the MAP information.

The control message extraction section 30 extracts a control message contained in the data signal received, and sends information on the control message to the control section 27.

The packet generation section 31 generates a packet using the received data signal, and sends it to the application processing section 17.

(2) First Embodiment

Figure 11:
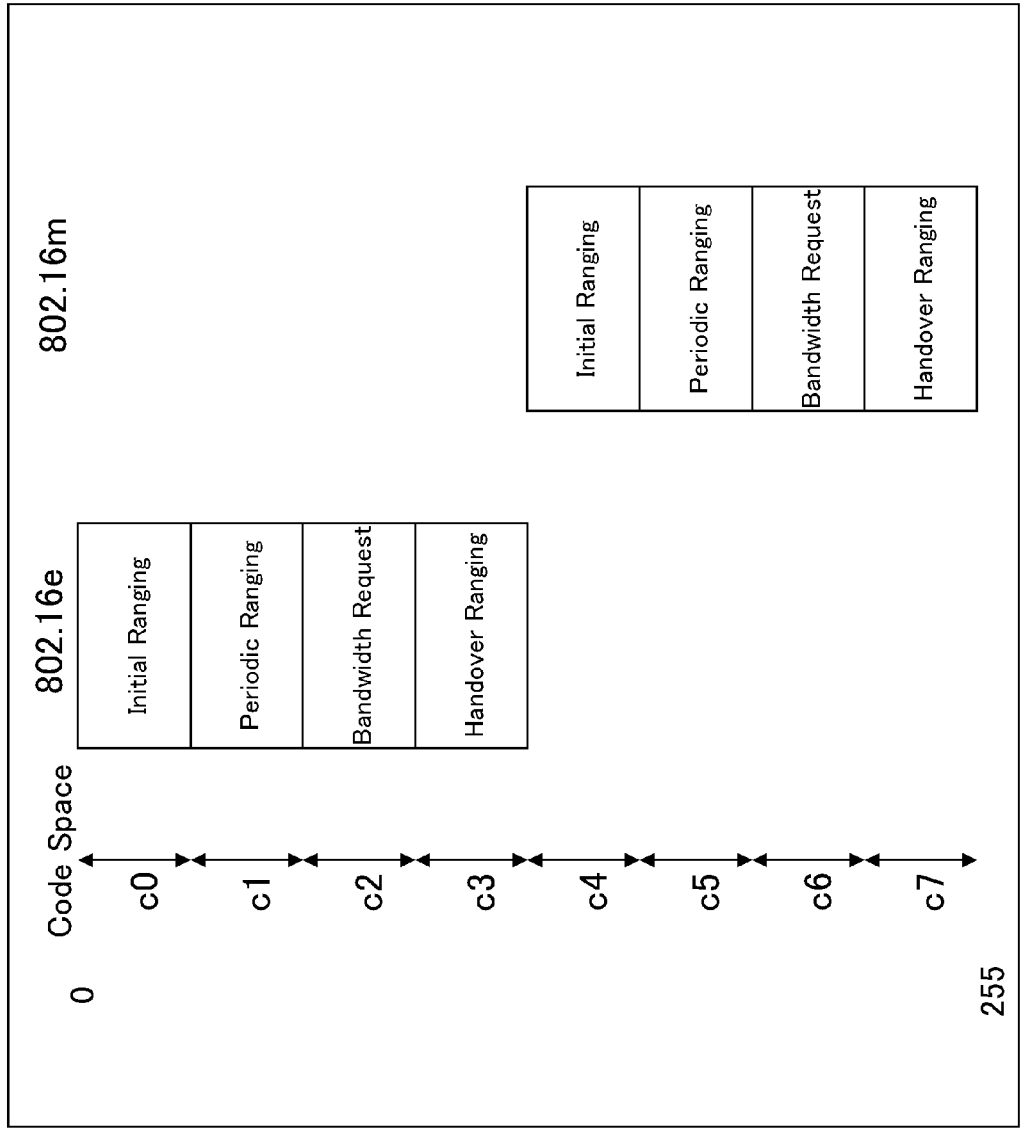
FIG. 11 is a diagram illustrating an example of allocation of CDMA code patterns in a first embodiment.

An example of allocation of CDMA code patterns to mobile stations in this embodiment is depicted in FIG. 11.

In FIG. 11, pattern ranges c0 to c7 indicate the CDMA code pattern ranges.

Different pattern ranges may be set for each communication region and for each purpose. For example, pattern ranges c0-c3 and c4-c7 are set for the 802.16e communication region and the 802.16m communication region, respectively, and for each purpose.

The CDMA code pattern ranges may be set by a base station, and such setting information may be broadcasted to mobile stations using a UCD (Uplink Channel Descriptor) message, for example.

In the above example, pattern ranges are set such that patterns for the 802.16e communication region do not overlap with those for the 802.16m communication. However, a part of the ranges of the regions may overlap for some purposes, for example.

An example of information included in a UCD message is illustrated in FIG. 12.

In the setting information on the CDMA codes included in the UCD message, 256 CDMA code patterns listed are classified into multiple ranges for each communication region and for each purpose.

For example, the CDMA code pattern ranges are set for "Initial Ranging", "Periodic Ranging", "Bandwidth Request", and "Handover Ranging" for the 802.16e communication region, and "Initial Ranging", "Periodic Ranging", "Bandwidth Request", and "Handover Ranging" for the 802.16m communication region, and the boundaries therebetween are indicated.

More specifically, the parameter "S" specifying the start of CDMA code pattern ranges, and the parameters "N", "M", "L", "O", "N__16m", "M__16m", "L__16m", and "O__16m" specifying the counts of the respective codes are indicated. In this case, a CDMA code pattern range used for a certain purpose for a certain communication region range may be located somewhere from "S" to "(S+N+M+L+O+N__16m+M__16m+L__16m+0__16m) mod 256", for example. For example, if "S" is 80 and "(S+N+M+L+O+N__16m+M__16m+L__16m+O__16m) mod 256" is 10, the CDMA code pattern range is 80-255 and 0-10.

Figure 13:
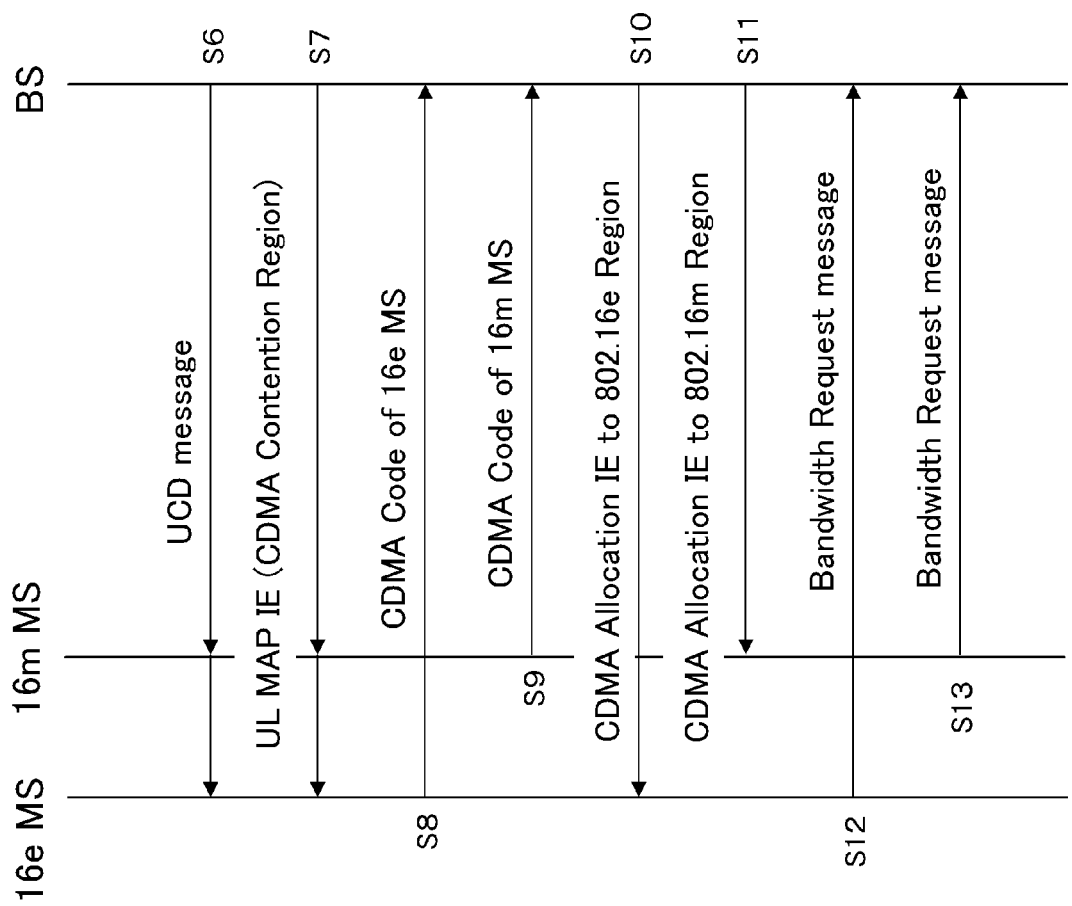
FIG. 13 is a sequence diagram of allocation of a communication region in the first embodiment.

An example of a sequence when allocating a communication region between a base station and a mobile station is illustrated in FIG. 13.

In S6, the base station sends a UCD message including CDMA code pattern setting information to 802.16e-compliant mobile stations and 802.16m-compliant mobile stations.

In S7, the base station also sends a UL-MAP IE including location information on the CDMA Contention Region that is commonly used by both the 802.16e and 802.16m communication regions within a frame, to the 802.16e-compliant and 802.16m-compliant mobile stations.

In S8, an 802.16e-compliant mobile station selects a CDMA code that is to be sent to the base station based on the information indicative of the CDMA code pattern ranges within the UCD message received in S6. For example, when requesting a communication region for transmitting a Bandwidth Request message, the mobile station selects a CDMA code from the ranges for the Bandwidth Request code for the 802.16e communication region in FIG. 12. The 802.16e-compliant mobile station sends the selected CDMA code to the base station.

In S9, an 802.16m-compliant mobile station selects a CDMA code that is to be sent to the base station based on the information indicative of the CDMA code pattern ranges within the UCD message received in S6. For example, when requesting a communication region for transmitting a Bandwidth Request message, the mobile station selects a CDMA code from the ranges for the Bandwidth Request code for the 802.16m communication region in FIG. 12. The 802.16m-compliant mobile station sends the selected CDMA code to the base station.

In S10, the base station generates a CDMA allocation IE for allocating an 802.16e communication region in the UL sub-frame based on the CDMA code for 802.16e region received in S8, and sends it to the 802.16e-compliant mobile station.

In S11, the base station generates a CDMA Allocation IE for allocating an 802.16m communication region in the UL sub-frame based on the CDMA code for the 802.16m region received in S9, and sends it to the 802.16m-compliant mobile station.

The 802.16m-compliant mobile station can communicate in both 802.16m and 802.16e communication regions. Thus, an 802.16e communication region may be allocated to the 802.16m-compliant mobile station if there are not sufficient wireless resources of the 802.16m communication region, for example.

Therefore, in S11, the base station may generate a CDMA allocation IE for allocating an 802.16e communication region in the UL sub-frame based on the CDMA code for the 802.16m region received in S9, and may send it to the 802.16m-compliant mobile station.

In S12, the 802.16e-compliant mobile station sends a Bandwidth Request message to the base station in the region in the UL sub-frame, i.e., the 802.16e communication region, allocated using the CDMA allocation IE received in S10.

In S13, the 802.16m-compliant mobile station sends a Bandwidth Request message to the base station in the region in the UL sub-frame, i.e., the 802.16m communication region or 802.16e communication region, allocated using the CDMA allocation IE received in S11.

Figure 14:
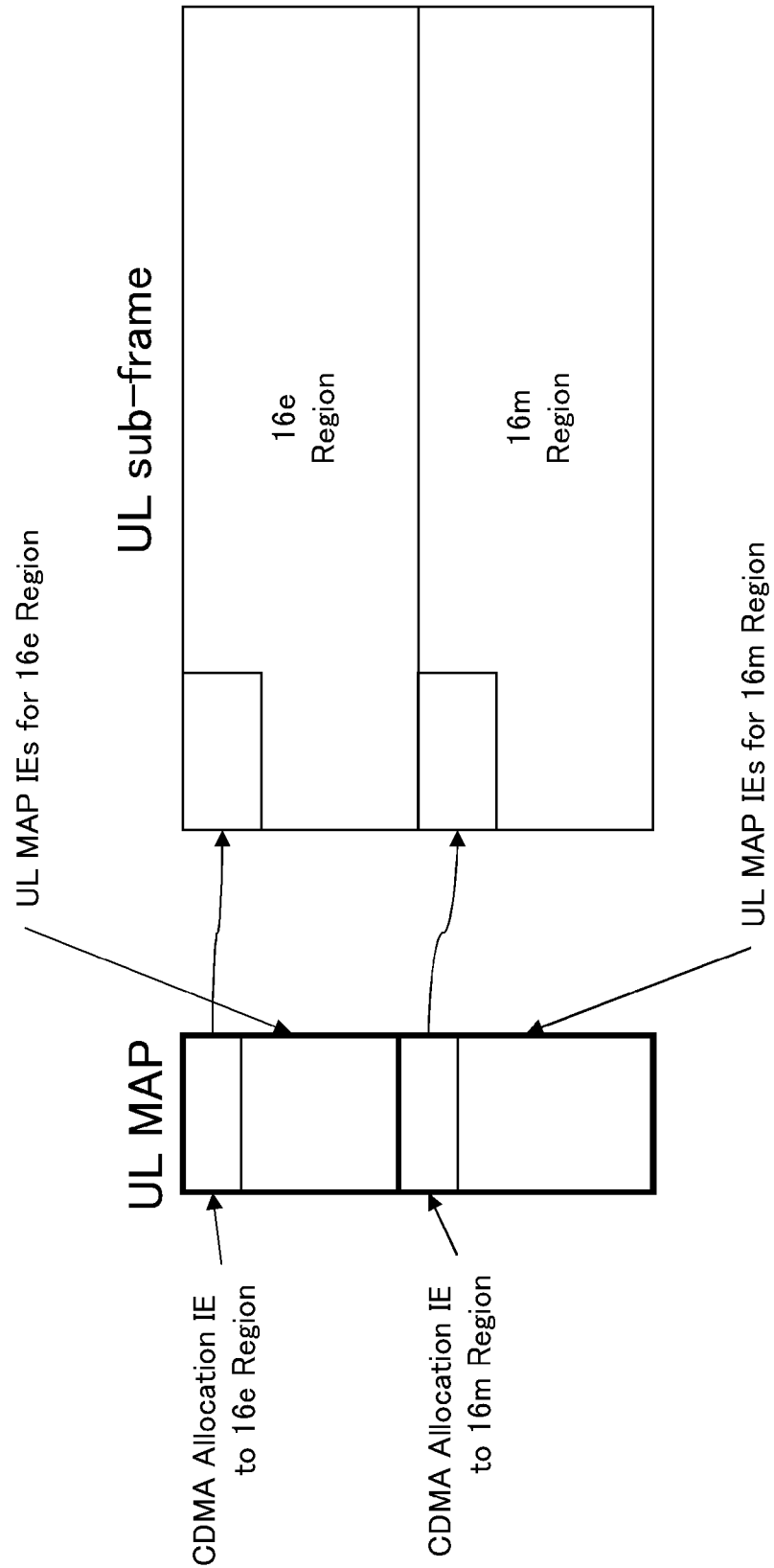
FIG. 14 is a diagram illustrating an example of a UL-MAP in the first embodiment.

An example of a UL-MAP set by a base station in response to receiving the CDMA codes for the 802.1e communication region and the 802.16m communication region is illustrated in FIG. 14.

The base station sets a communication region within the 802.16e communication region in the UL sub-frame specified in the CDMA allocation IE, for a CDMA code for the 802.16e communication region, or sets a communication region within the 802.16m communication region in the UL sub-frame specified in the CDMA allocation IE, for a CDMA code for the 802.16m communication region.

Figure 15:
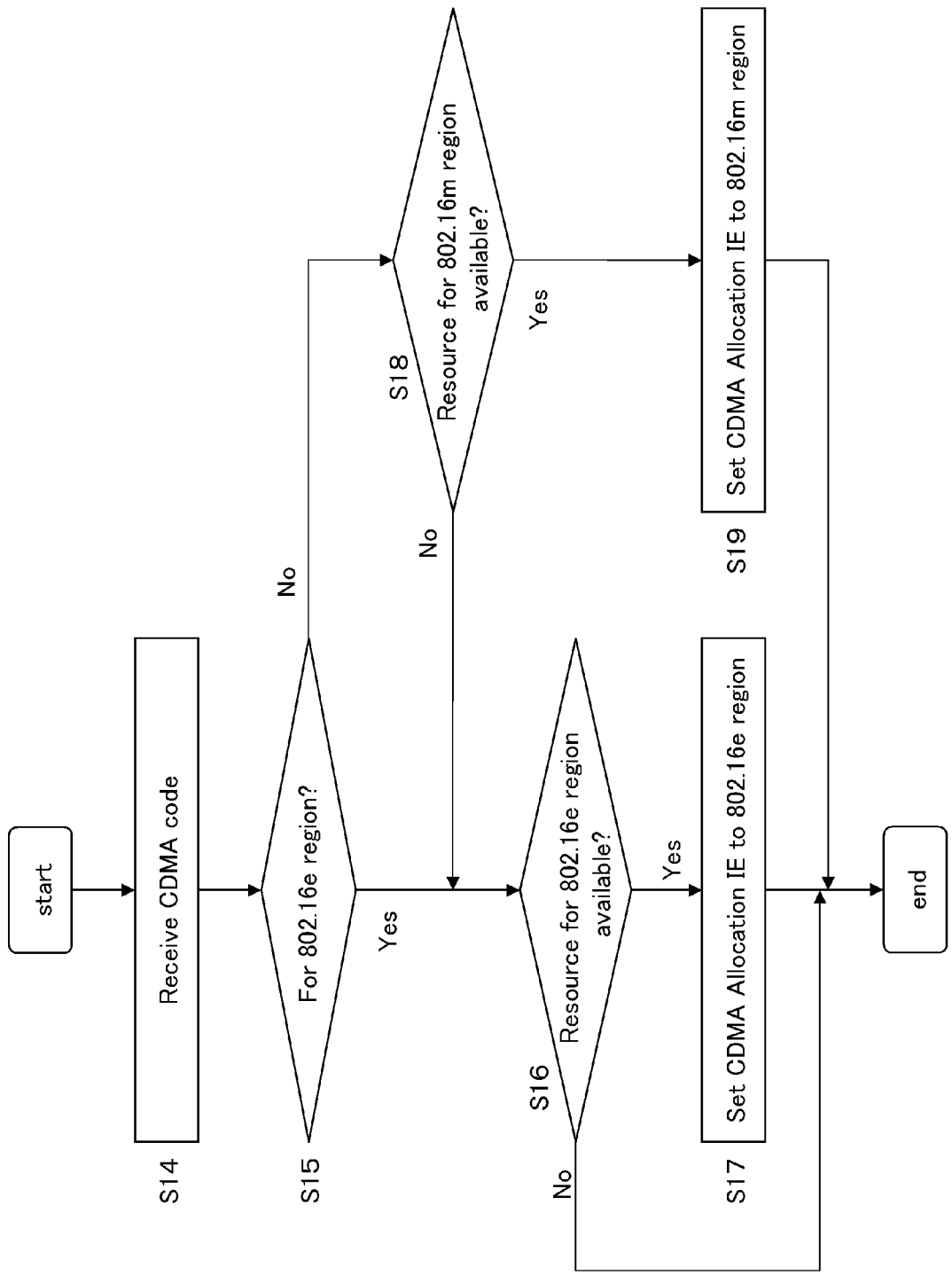
FIG. 15 is a flowchart illustrating an example of a flow when setting a CDMA allocation IE in the first embodiment.

An example of a processing flow upon when a base station receives a CDMA code and sets a CDMA allocation IE to a mobile station that has sent the CDMA code is illustrated in FIG. 15.

In S14, the base station receives a CDMA code.

In S15, the base station determines whether the CDMA code received in S14 has a CDMA code pattern for the 802.16e communication region. When the code is determined as having a CDMA code pattern for the 802.16e communication region, the flow proceeds to S16. Otherwise, when the code is determined as not having a CDMA code pattern for the 802.16e communication region (i.e., when the code is determined as having a CDMA code pattern for the 802.16m communication region), the flow proceeds to S18.

In S16, a determination is made as to whether wireless resources for the 802.16e communication region are available. When it is determined that there are sufficient wireless resources in the 802.16e communication region (when "Yes" in S16), the flow proceeds to S17. Otherwise, when it is determined that there are not sufficient wireless resources in the 802.16e communication region (when "No" in S16), the processing terminates without setting a CDMA allocation IE.

In S17, a CDMA allocation IE is set for the 802.16e communication region.

In S18, a determination is made as to whether wireless resources for the 802.16m communication region are available. When it is determined that there are sufficient wireless resources in the 802.16m communication region (when "Yes" in S18), the flow proceeds to S19. Otherwise, when it is determined that there are not sufficient wireless resources in the 802.16m communication region (when "No" in S18), the flow proceeds to S16.

In S19, a CDMA allocation IE is set for the 802.16m communication region.

Figure 16:
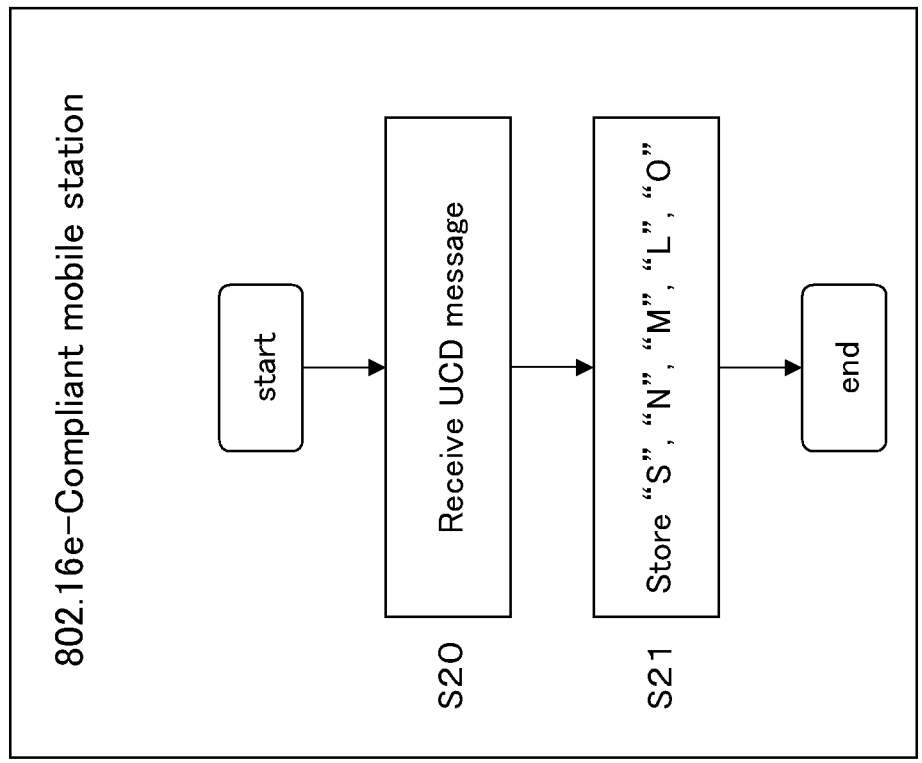
FIG. 16 is a flowchart illustrating an example of a processing flow when an 802.16e-compliant mobile station receives a UCD message in the first embodiment.
Figure 17:
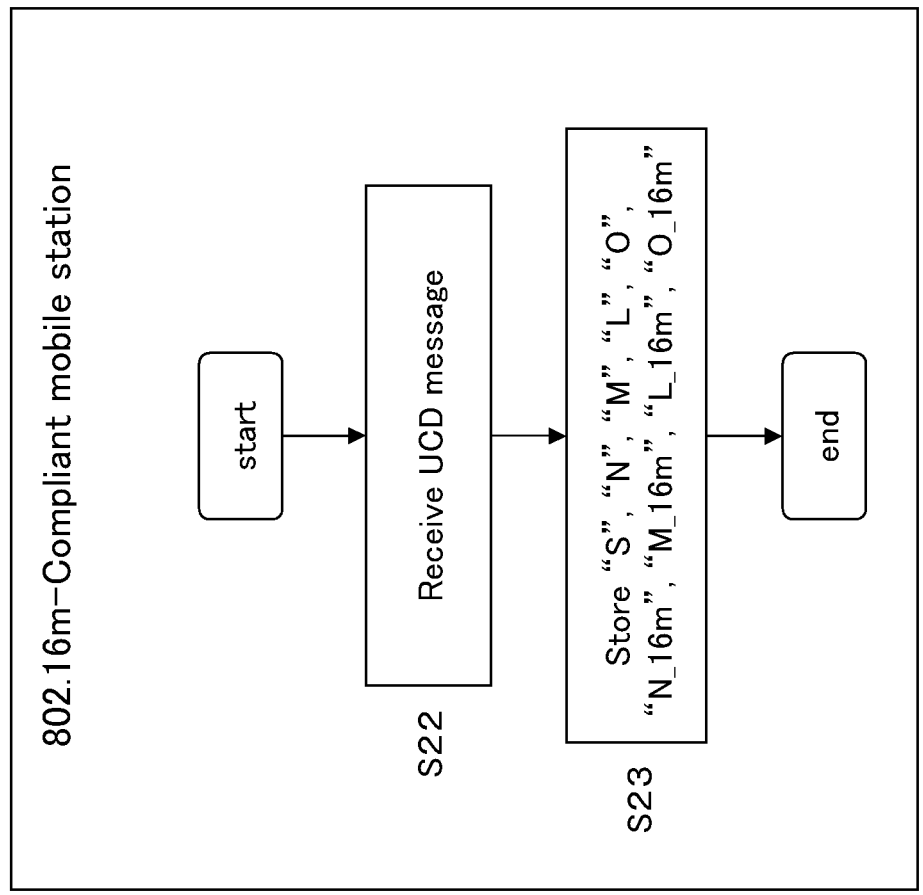
FIG. 17 is a flowchart illustrating an example of a processing flow when an 802.16m-compliant mobile station receives a UCD message in the first embodiment.

FIGS. 16 and 17 are flowcharts illustrating examples of processing flows when a mobile station receives a UCD message broadcasted from a base station.

FIG. 16 illustrates an example of a processing flow when an 802.16e-compliant mobile station receives a UCD message.

In S20, the mobile station receives a UCD message.

In S21, the mobile station stores information indicative of the CDMA code pattern ranges in the UCD message received in S20. The 802.16e-compliant mobile station stores the values of parameters "S", "N", "M", "L", and "O" from the range information (see FIG. 12).

FIG. 17 illustrates an example of a processing flow when an 802.16m-compliant mobile station receives a UCD message.

In S22, the mobile station receives a UCD message.

In S23, the mobile station stores information indicative of the CDMA code pattern ranges in the UCD message received in S22. The 802.16m-compliant mobile station stores the values of parameters "S", "N", "M", "L", "O", "N_16m", "M_16m", "L_16m", and "O_16m" from the range information (see FIG. 12).

Figure 18:
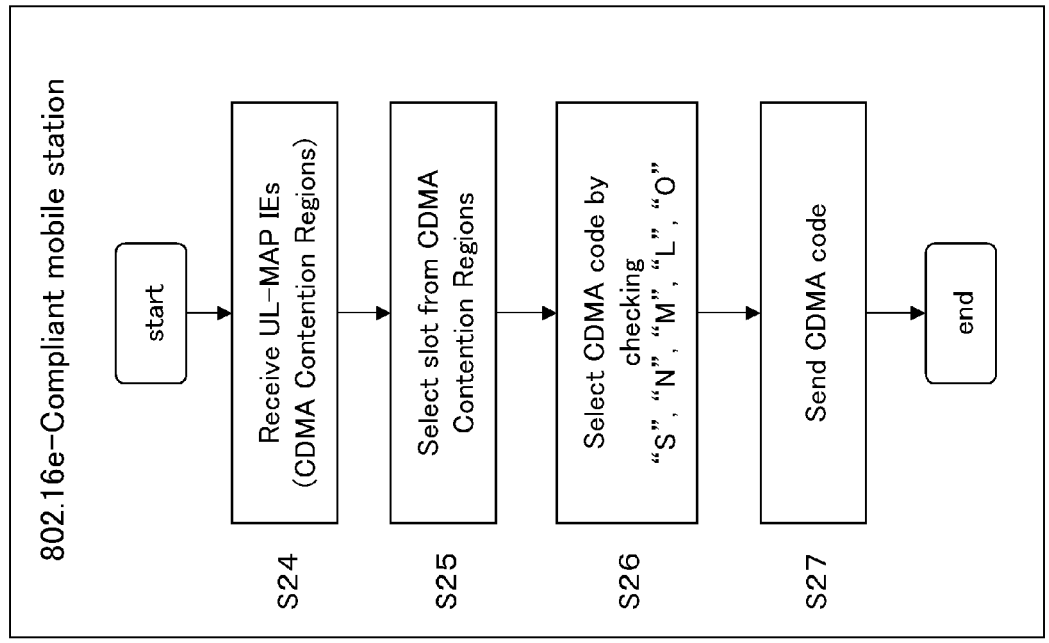
FIG. 18 is a flowchart illustrating an example of a processing flow when an 802.16e-compliant mobile station sends a CDMA code in the first embodiment.
Figure 19:
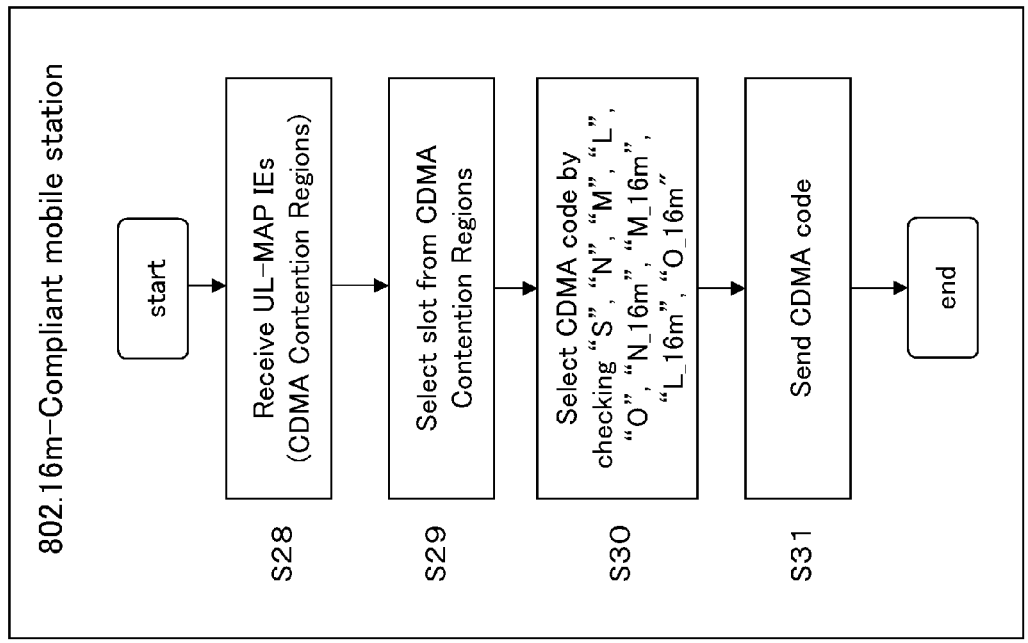
FIG. 19 is a flowchart illustrating an example of a processing flow when an 802.16m-compliant mobile station sends a CDMA code in the first embodiment.

FIGS. 18 and 19 are flowcharts illustrating examples of processing flows when a mobile station sends a CDMA code to the base station.

FIG. 18 illustrates an example of a processing flow when an 802.16e-compliant mobile station sends a CDMA code.

In S24, the mobile station receives a UL-MAP IE. This UL-MAP IE includes location information on a CDMA Contention Region in which the mobile station can send a CDMA code.

In S25, the mobile station selects a slot from the CDMA Contention Region specified in the UL-MAP IE received in S24, which the mobile station uses for sending a CDMA code.

In S26, the mobile station selects a CDMA code pattern for sending to the base station, by making reference to the CDMA code pattern range information stored in the mobile station, i.e., the values of the parameters "S", "N", "M", "L", and "O" (see FIG. 12).

For example, for sending a Bandwidth Request code, the mobile station selects a CDMA code pattern for sending ranging from "S" "N" "M" to "S" "N" "M" "O"−1.

In S27, the mobile station sends the CDMA code pattern selected in S26 to the base station, in the slot within the CDMA Contention Region selected in S25.

FIG. 19 illustrates an example of a processing flow when an 802.16m-compliant mobile station sends a CDMA code.

In S28, the mobile station receives a UL-MAP IE. This UL-MAP IE includes location information of a CDMA Contention Region in which the mobile station can send a CDMA code.

In S29, the mobile station selects a slot from the CDMA Contention Region specified in the UL-MAP IE received in S28, which the mobile station uses for sending a CDMA code.

In S30, the mobile station selects a CDMA code pattern for sending to the base station, by making reference to the CDMA code pattern range information stored in the mobile station, i.e., the values of the parameters "S", "N", "M", "L", "O", "N_16m", "M_16m", "L_16m", and "O_16m" (see FIG. 12).

For example, for sending a Bandwidth Request code, the mobile station selects a CDMA code pattern for sending ranging from "S"+"N"+"M"+"L"+"O"+"N_16m"+"M_16m" to "S"+"N"+"M"+"L"+"O"+"N_16m"+"M_16m"+"O_16m"−1.

In S31, the mobile station sends the CDMA code of the CDMA code pattern selected in S30 to the base station, in the slot within the CDMA Contention Region selected in S29.

(3) Variant of First Embodiment

Figure 20:
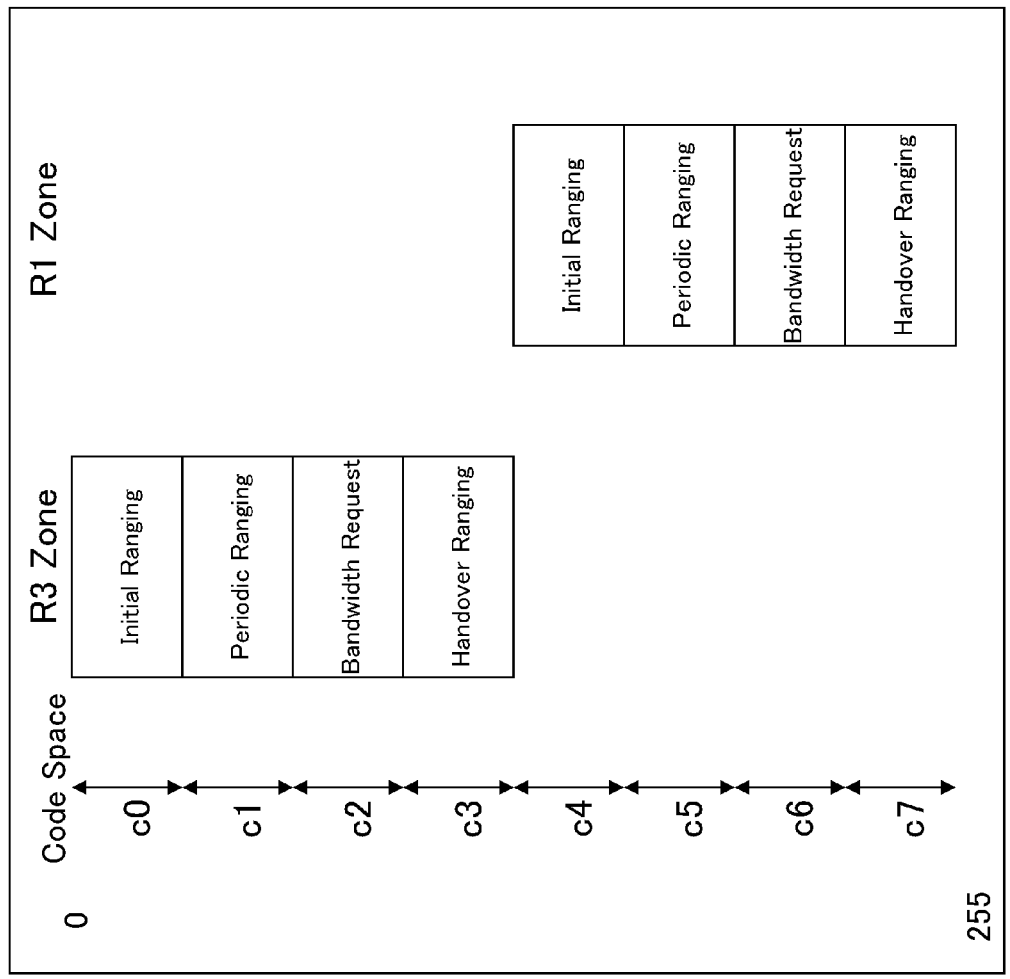
FIG. 20 is a diagram illustrating an example of allocation of CDMA code patterns in a variant of the first embodiment.

An example of allocation of CDMA code patterns to mobile stations in this embodiment is depicted in FIG. 20.

In FIG. 20, pattern ranges c0 to c7 indicate the CDMA code pattern ranges.

Different pattern ranges may be set for each communication region and for each purpose. For example, pattern ranges c0-c3 and c4-c7 are set for the R3 and R1 Zones, respectively, and for each purpose.

The CDMA code pattern ranges may be set by a base station, and such setting information may be broadcasted to mobile stations using a UCD message, for example.

In the above example, pattern ranges are set such that patterns for the R3 Zone do not overlap with those for the R1 Zone. However, a part of the ranges of the zones may overlap for some purposes, for example.

An example of information included in a UCD message is illustrated in FIG. 21.

In the UCD message in this embodiment, the CDMA code pattern ranges are set for "InitialRanging", "PeriodicRanging", "Bandwidth Request", and "HandoverRanging" for the R3 Zone and "InitialRanging", "Periodic Ranging", "Bandwidth Request", and "Handover Ranging" for the R1 Zone, and the boundaries therebetween are indicated.

More specifically, the parameter "S" specifying the start of CDMA code pattern ranges, and the parameters "N", "M", "L", "O", "N_R1", "M_R1", "L_R1", and "O_R1" specifying the counts of the respective codes are indicated. In this case, a CDMA code pattern range used for a certain purpose for a certain communication region range may be located somewhere from "S" to "(S+N+M+L+O+N_R1+M_R1+L_R1+O_R1) mod 256", for example. For example, if "S" is 80 and "(S+N+M+L+O+N_R1+M_R1+L_R1+O_R1) mod 256" is 10, the CDMA code pattern range is 80-255 and 0-10.

Figure 22:
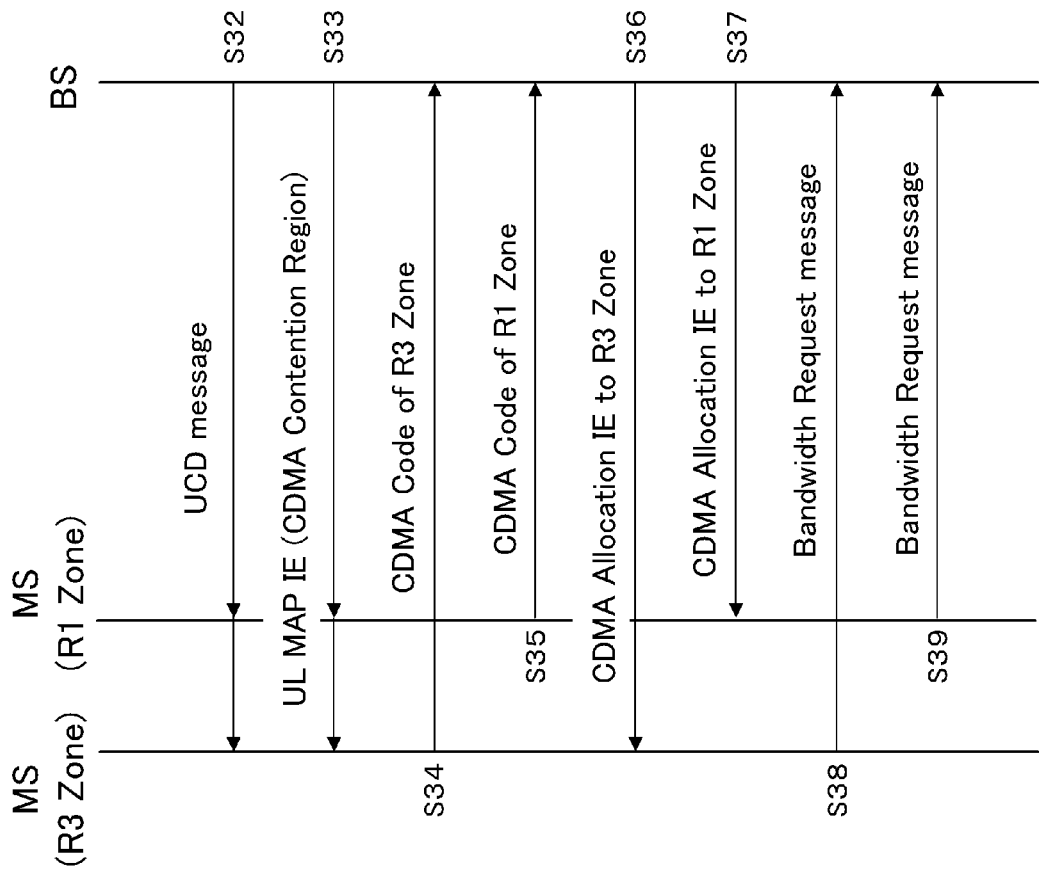
FIG. 22 is a sequence diagram of allocation of a communication region in the variant of the first embodiment.

An example of a sequence when allocating a communication region between a base station and a mobile station is illustrated in FIG. 22.

In S32, the base station sends a UCD message including CDMA code pattern setting information to mobile stations.

In S33, the base station also sends a UL-MAP IE including location information on the CDMA Contention Region that is commonly used by both the R3 and R1 Zones, within a frame to the mobile stations.

In S34, a mobile station that selects to communicate in a communication region in the R3 Zone (hereinafter, referred to as the "R3 Zone selecting mobile station") selects a CDMA code for sending to the base station, based on the information indicative of the CDMA code pattern ranges within the UCD message received in S32. For example, when requesting a communication region for transmitting a Bandwidth Request message, the mobile station selects a CDMA code from the ranges for the Bandwidth Request code for the R3 Zone in FIG. 21. The R3 Zone selecting mobile station sends the selected CDMA code to the base station.

In S35, a mobile station that selects to communicate in a communication region in the R1 Zone (hereinafter, referred to as the "R1 Zone selecting mobile station") selects a CDMA code for sending to the base station, based on the information indicative of the CDMA code pattern ranges within the UCD message received in S32. For example, when requesting a communication region for transmitting a Bandwidth Request message, the mobile station selects a CDMA code from the ranges for the Bandwidth Request code for the R1 Zone in FIG. 21. The R1 Zone selecting mobile station sends the selected CDMA code to the base station.

In S36, the base station generates a CDMA allocation IE for allocating an R3 Zone in the UL sub-frame based on the CDMA code for the R3 Zone received in S34, and sends it to the mobile station selecting the R3 Zone.

In S37, the base station generates a CDMA allocation IE for allocating an R1 Zone in the UL sub-frame based on the CDMA code for the R1 Zone received in S35, and sends it to the mobile station selecting the R1 Zone.

The mobile station selecting the R1 Zone can communicate in both the R1 and R3 Zones. Thus, an R3 Zone may be allocated to the mobile station selecting the R1 Zone if there are not sufficient wireless resources of the R1 Zone, for example.

Accordingly, in S37, the base station may generate a CDMA allocation IE for allocating an R3 Zone in the UL sub-frame based on the CDMA code for the R1 Zone received in S35, and may send it to the mobile station selecting the R1 Zone.

In S38, the mobile station selecting the R3 Zone sends a Bandwidth Request message to the base station in the communication region in the UL sub-frame, i.e., the R3 Zone, allocated using the CDMA allocation IE received in S36.

In S39, the mobile station selecting the R1 Zone sends a Bandwidth Request message to the base station in the region in the UL sub-frame, i.e., the R1 Zone or the R3 Zone, allocated using the CDMA allocation IE received in S37.

Figure 23:
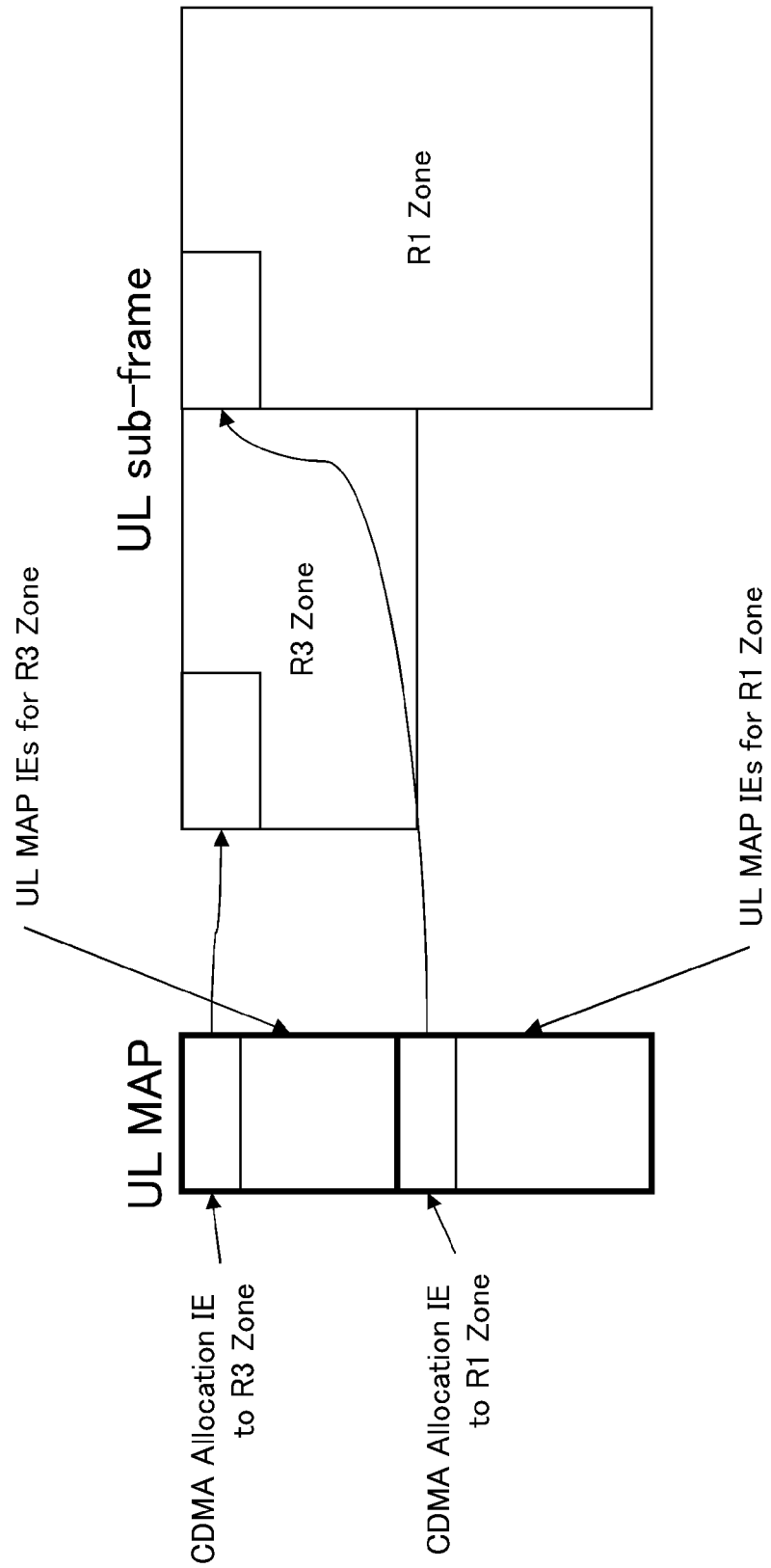
FIG. 23 is a diagram illustrating an example of a UL-MAP in the variant of first embodiment.

An example of a UL-MAP set by a base station in response to receiving the CDMA codes for the R3 Zone and the R1 Zone is illustrated in FIG. 23.

The base station sets a communication region in the R3 Zone in the UL sub-frame specified in the CDMA allocation IE, for a CDMA code for the R3 Zone, or sets a communication region in the R1 Zone in the UL sub-frame specified in the CDMA allocation IE, for a CDMA code for the R1 Zone.

Figure 24:
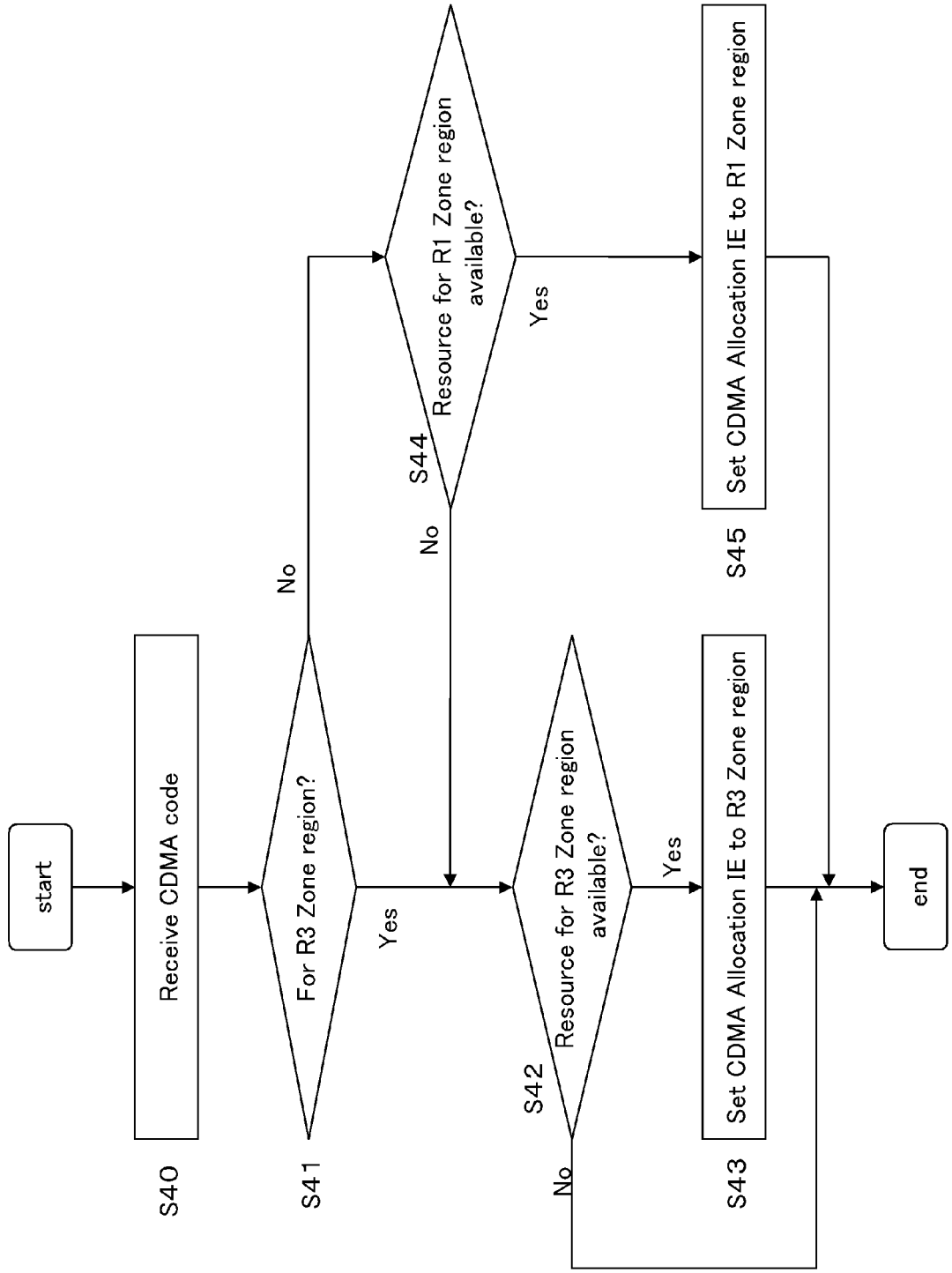
FIG. 24 is a flowchart illustrating an example of a flow for setting a CDMA allocation IE in the variant of the first embodiment.

FIG. 24 is a flowchart illustrating an example of a processing flow upon when a base station receives a CDMA code and sets a CDMA allocation IE to a mobile station that has sent the CDMA code.

In S40, the base station receives a CDMA code.

In S41, the base station determines whether the CDMA code received in S40 has a CDMA code pattern for the R3 Zone. When the code is determined as having a CDMA code pattern for the R3 Zone (when "Yes" in S41), the flow proceeds to S42. Otherwise, when the code is determined as not having a CDMA code pattern for the R3 Zone (i.e., when the code is determined as having a CDMA code pattern for the R1 Zone) (when "No" in S41), the flow proceeds to S44.

In S42, a determination is made as to whether wireless resources for the R3 Zone are available. When it is determined that there are sufficient wireless resources in the R3 Zone (when "Yes" in S42), the flow proceeds to S43. Otherwise, when it is determined that there are not sufficient wireless resources in the R3 Zone (when "No" in S42), the processing terminates without setting a CDMA allocation IE.

In S43, a CDMA allocation IE is set for the R3 Zone.

In S44, a determination is made as to whether wireless resources for the R1 Zone are available. When it is determined that there are sufficient wireless resources in the R1 Zone (when "Yes" in S44), the flow proceeds to S45. Otherwise, when it is determined that there are not sufficient wireless resources in the R1 Zone (when "No" in S44), the flow proceeds to S42.

In S45, a CDMA allocation IE is set for the R1 Zone.

Figure 25:
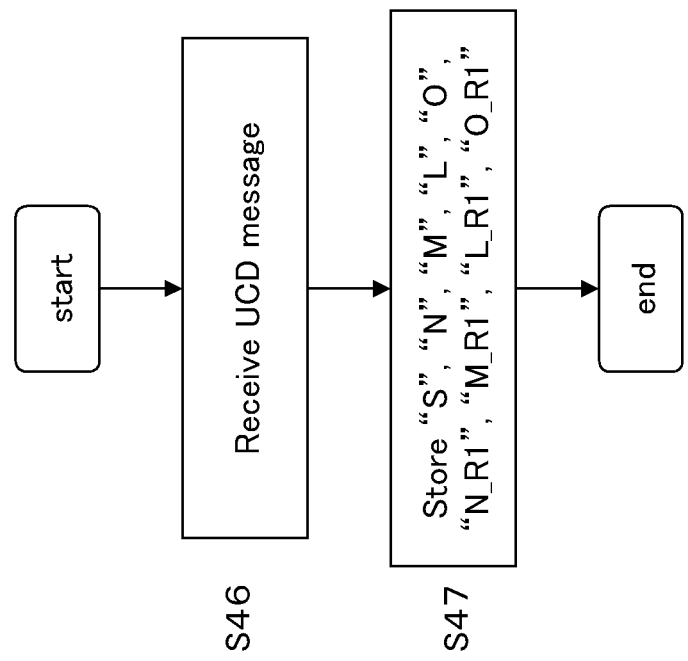
FIG. 25 is a flowchart illustrating an example of a processing flow when a mobile station receives a UCD message in the variant of the first embodiment.

FIG. 25 is a flowchart illustrating an example of a processing flow when a mobile station receives a UCD message broadcasted from a base station.

In S46, the mobile station receives a UCD message.

In S47, the mobile station stores information indicative of the CDMA code pattern ranges in the UCD message received in S46. Since the wireless environments around the mobile stations may be varied, a mobile station communicating in the R1 Zone may switch to communications in the R3 Zone or a mobile station communicating in the R3 Zone may switch to communications in the R1 Zone. Accordingly, both the parameter values for the R1 and R3 Zones, i.e., the values of parameters "S", "N", "M", "L", "O", "N_R1", "M_R1", "L_R1", and "O_R1", are stored (see FIG. 21).

Figure 26:
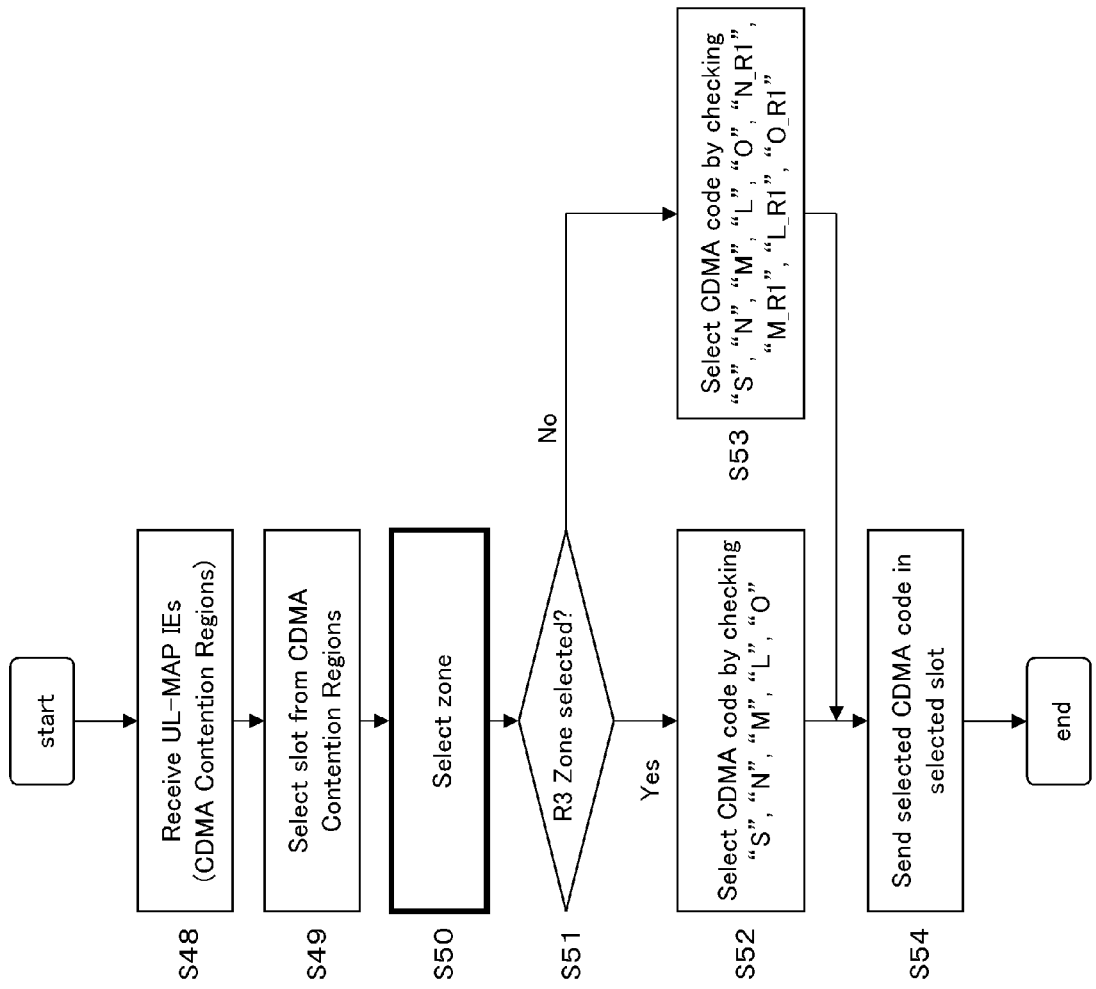
FIG. 26 is a flowchart illustrating an example of a processing flow when a mobile station sends a CDMA code in the variant of the first embodiment.

FIG. 26 is a flowchart illustrating an example of a processing flow when a mobile station sends a CDMA code to a base station.

In S48, the mobile station receives a UL-MAP IE. This UL-MAP IE includes location information on a CDMA Contention Region in which the mobile station can send a CDMA code.

In S49, the mobile station selects a slot from the CDMA Contention Region specified in the UL-MAP IE received in S48, which the mobile station uses for sending a CDMA code.

In S50, the mobile station selects a Zone, which the mobile station uses for sending a CDMA code to the base station.

In S51, a determination is made as to whether the R3 Zone is selected (or the R1 Zone is selected) in S50. When the R3 Zone is selected (when "Yes" in S51), the flow proceeds to S52. Otherwise, when the R1 Zone is selected (when "No" in S51), the flow proceeds to S53.

In S52, the mobile station selects a CDMA code pattern for sending to the base station, by making reference to the CDMA code pattern range information stored in the mobile station, i.e., the values of the parameters "S", "N", "M", "L", and "O" (see FIG. 21).

For example, for sending a Bandwidth Request code, the mobile station selects a CDMA code pattern for sending ranging from "S" "N" "M" to "s" "N" "M" "O"−1.

In S53, the mobile station selects a CDMA code pattern for sending to the base station, by making reference to the CDMA code pattern range information stored in the mobile station, i.e., the values of the parameters "S", "N", "M", "L", "O", "N_R1", "M_R1", "L_R1", and "O_R1" (see FIG. 21).

For example, for sending a Bandwidth Request code, the mobile station selects a CDMA code pattern for sending ranging from "S"+"N"+"M"+"L"+"O"+"N_R1"+"M_R1" to "S"+"N"+"M"+"L"+"O"+"N_R1"+"M_R1"+"O_R1"−1.

In S54, the mobile station sends the CDMA code pattern selected in S52 or S53 to the base station, in the slot within the CDMA Contention Region selected in S49.

Figure 27:
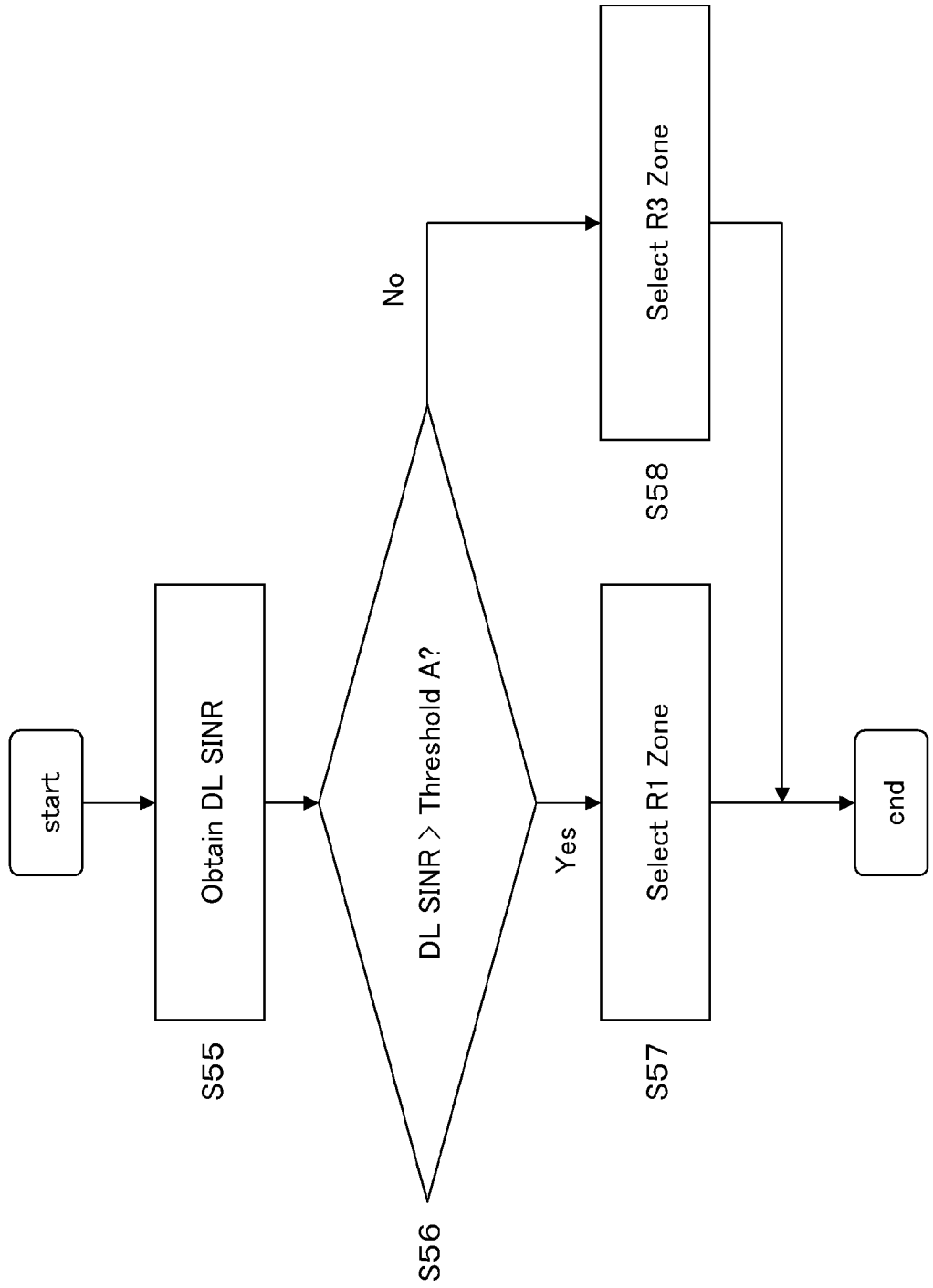
FIG. 27 is a flowchart illustrating an example of a flow when a mobile station selects a Zone.
Figure 28:
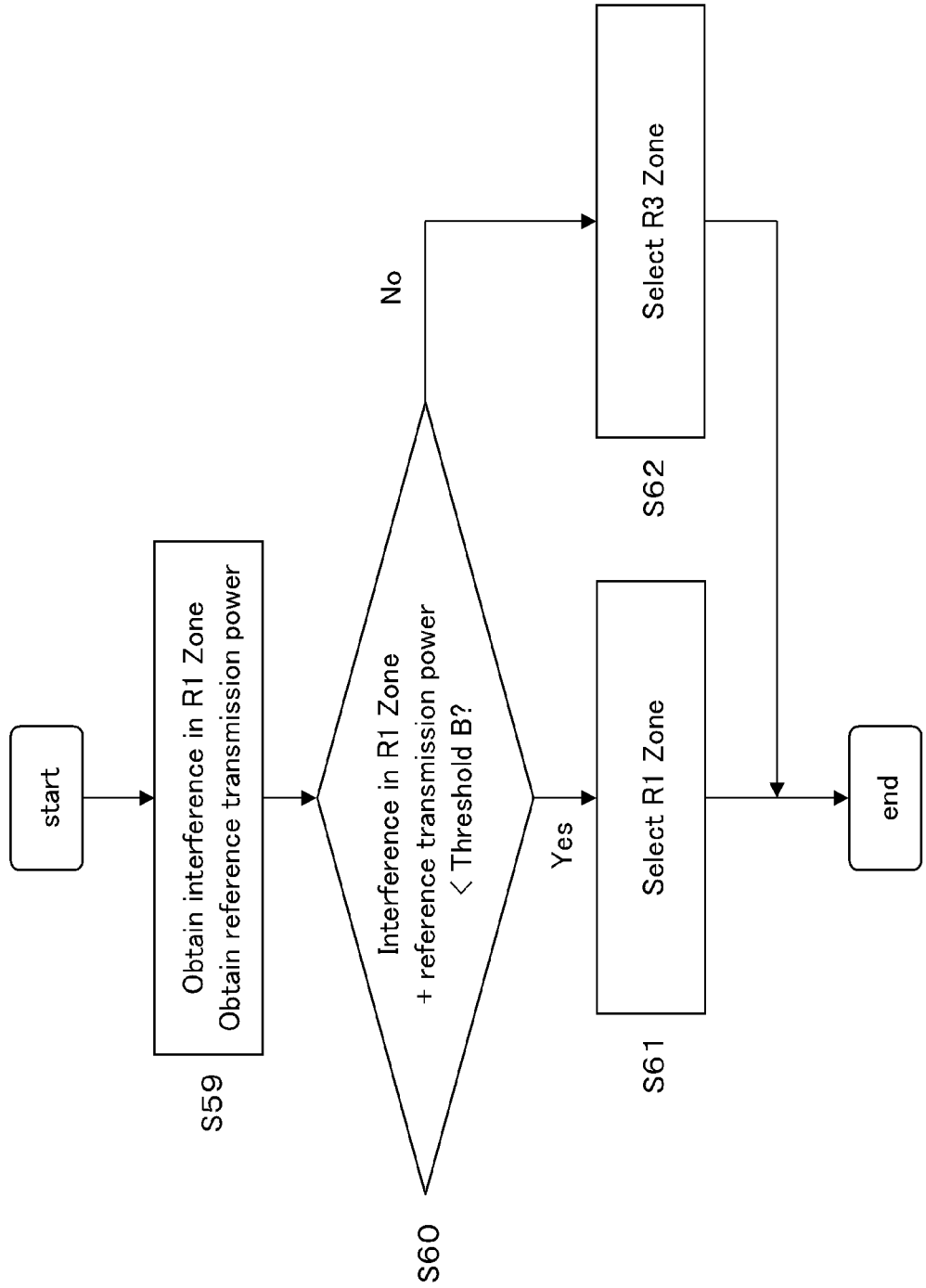
FIG. 28 is a flowchart illustrating another example of a flow when a mobile station selects a Zone.
Figure 31:
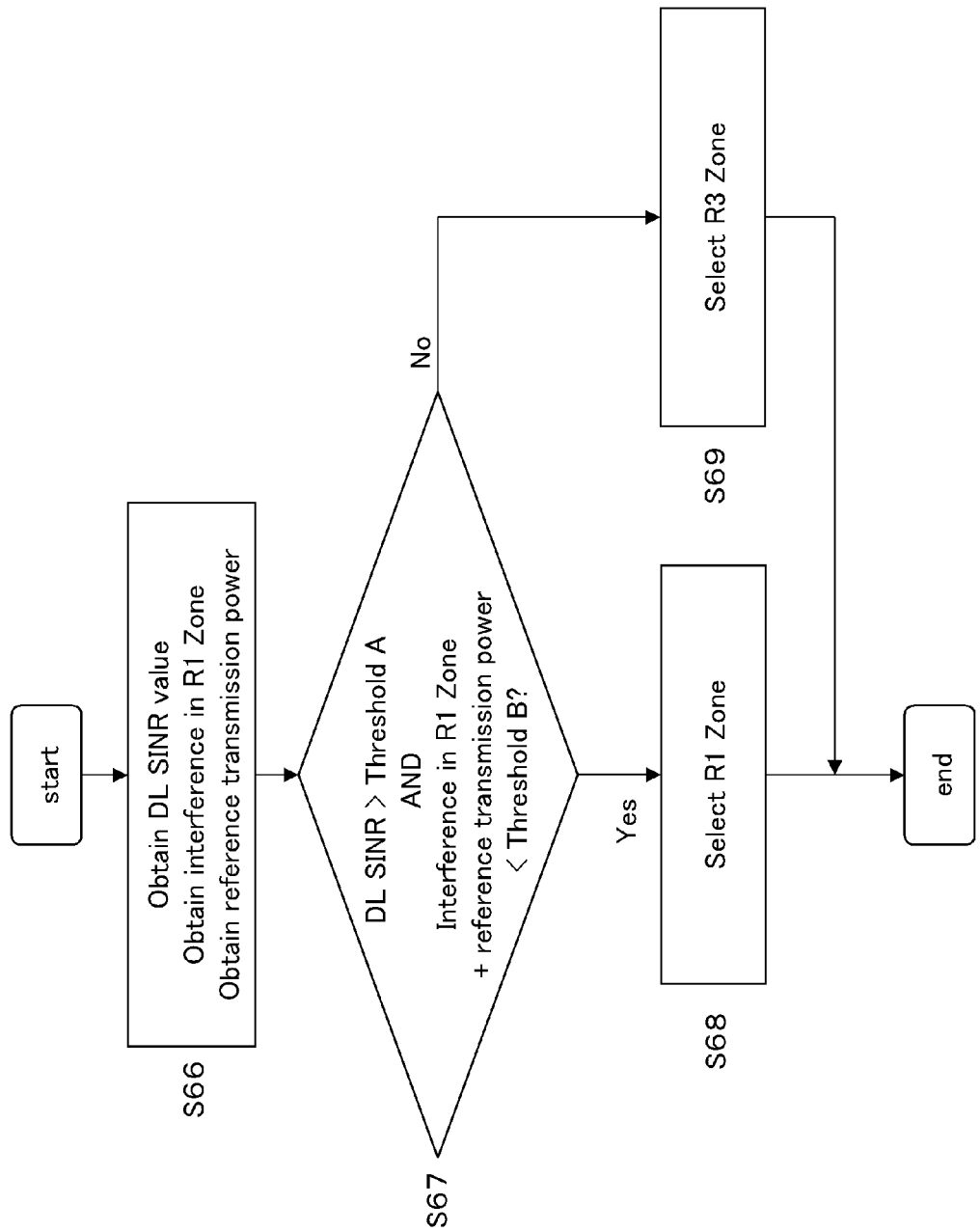
FIG. 31 is a flowchart illustrating a further example of a flow when a mobile station selects a Zone.

FIGS. 27, 28, and 31 are flowcharts illustrating examples of processing flows when a mobile station selects a Zone in S50 in FIG. 26.

FIG. 27 illustrates an example of a flow when a mobile station selects a Zone.

In S55, the SINR (Signal to Interference and Noise Ratio) value of a DL signal is obtained. The mobile station measures the quality of a DL signal sent from the base station continuously or periodically or at irregular intervals, and stores the measured SINR value in its storage section.

In S56, the mobile station looks up the SINR value of the DL signal stored in the storage section and compares it with a predetermined threshold value A before sending a CDMA code. This threshold value A has been notified by the base station to the mobile station in a UCD message, for example.

When it is determined that the SINR value is greater than the threshold value A in S56 (when "Yes" in S56), the flow proceeds to S57. Otherwise, when it is determined that the SINR value is not greater than the threshold value A (the SINR value is smaller than threshold value A) (when "No" in S56), the flow proceeds to S58.

In S57, the R1 Zone is selected.

In S58, the R3 Zone is selected.

FIG. 28 illustrates another example when a mobile station selects a Zone.

In S59, the mobile station obtains the interference value of the signal from the base station in an R1 Zone during a UL period, as well as obtaining a reference transmission power value stored in its storage section. For example, it is assumed that this reference transmission power value is a power value per sub-carrier, adjusted in accordance with transmission power control by the base station. The mobile station calculates a transmission power value, which the mobile station uses for sending data, based on this reference transmission power value, considering the value of Burst Profile and the interference value of a UL signal.

In S60, the sum of the interference value in the R1 Zone and the reference transmission power value obtained in S59 is compared against a threshold value B. This threshold value B has been notified by the base station to the mobile station in a UCD message, for example.

In S60, when the sum is smaller than the threshold value B (when "Yes" in S60), the flow proceeds to 61, determining that the transmission power is sufficient and thus communications in the R1 Zone are possible. Otherwise, when the sum is not smaller than the threshold value B (when "No" in S60), the flow proceeds to S62, determining that the transmission power is not sufficient and thus communications in the R1 Zone are impossible (or, no communications should not be permitted).

In S61, the R1 Zone is selected.

In S62, the R3 Zone is selected.

Figure 29:
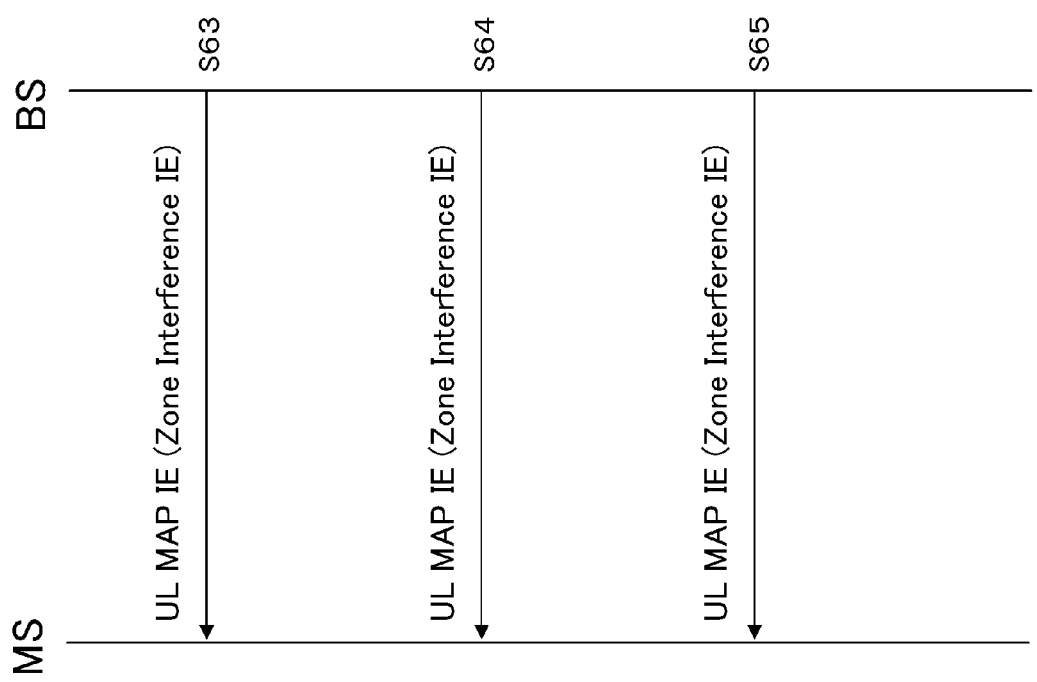
FIG. 29 is a sequence diagram when the base station notifies a mobile station of a signal interference value.

FIG. 29 illustrates an example of a sequence when the base station notifies the mobile station, by means of broadcasting, of the interference values of the signal in the R1 Zone and the R3 Zone during a UL period in FIG. 28.

The base station receives a signal sent from the mobile station during the UL period, and measures, by the wireless quality measurement section, the signal interference values of the received signal in the R1 and R3 Zones.

In S63, S64, and S65, the base station notifies the mobile station of the measured interference value information, by including the information in a UL-MAP IE.

The interference values may be notified periodically, or notified in response to any change in the interference value.

FIG. 30 illustrates an example of a UL-MAP IE sent from the base station to the mobile station in FIG. 29.

The UL-MAP IE indicates the signal interference value information in the R1 and R3 Zones measured by the base station for a signal sent from the mobile station during a UL period.

FIG. 31 illustrates a further example when a mobile station selects a Zone.

In S66, in addition to obtaining the SINR value of a DL signal as in FIG. 27, the signal interference value in the R1 Zone during a UL period and the reference transmission power value stored in the storage section in the mobile station are obtained, as in FIG. 28.

In S67, the SINR value obtained in S66 is compared against the threshold value A, and the sum of the interference value in the R1 Zone and the reference transmission power value is compared against the threshold value B. These threshold values A and B have been notified by the base station to the mobile station in a UCD message, for example.

In S67, when the SINR value is greater than the threshold value A and the sum is smaller than the threshold value B (when "Yes" in S67), the flow proceeds to S68. Otherwise, when the SINR value is not greater than the threshold value A, or the sum is not smaller than the threshold value B (when "No" in S67), the flow proceeds to S69.

In S68, the R1 Zone is selected.

In S69, the R3 Zone is selected.

(4) Second Embodiment

Figure 32:
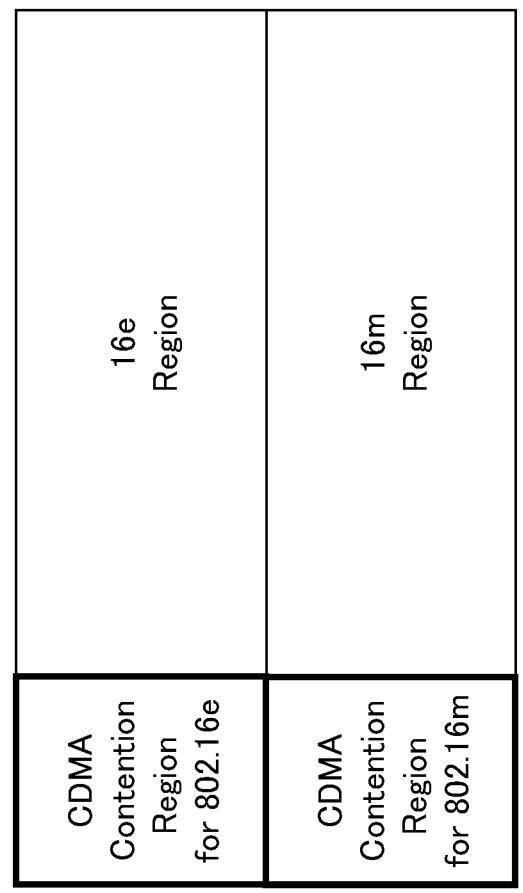
FIG. 32 is a diagram illustrating an example of a UL sub-frame structure used in a second embodiment.

FIG. 32 illustrates an example of a UL sub-frame structure used in this embodiment. In the present embodiment, as oppose to the frame structure depicted in FIG. 8, respective CDMA Contention Regions are provided for the 802.16e and 802.16m communication regions.

FIG. 33 illustrates an example of information included in a UCD message broadcasted from a base station to a mobile station in this embodiment.

Ina UCD message in this embodiment, the CDMA code pattern ranges are set for "InitialRanging", "PeriodicRanging", "Bandwidth Request", and "Handover Ranging" for both the 802.16e and 802.16m communication regions, and the boundaries therebetween are indicated.

More specifically, the parameter "S" specifying the start of CDMA code pattern ranges, and the parameters "N", "M", "L", and "O" specifying the counts of the respective codes are indicated.

Figure 34:
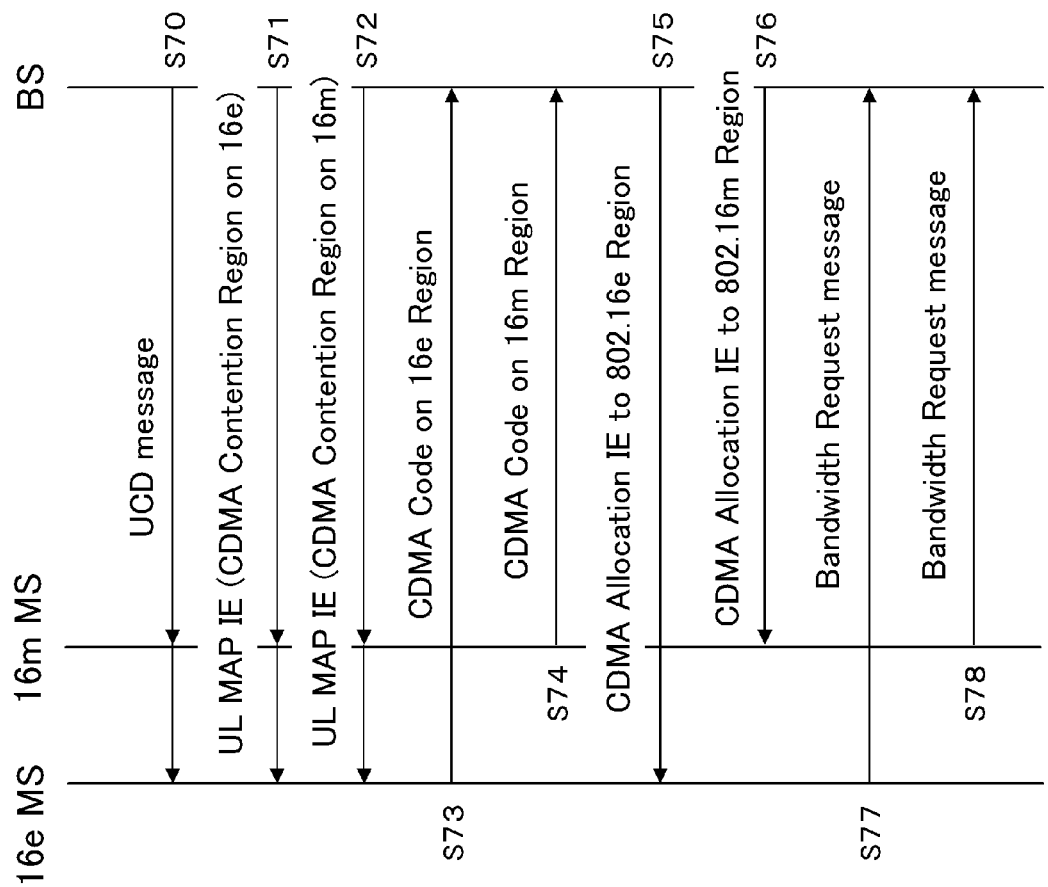
FIG. 34 is a sequence diagram of allocation of a communication region in the second embodiment.

An example of a sequence when allocating a communication region between a base station and a mobile station is illustrated in FIG. 34.

In S70, the base station sends a UCD message including CDMA code pattern setting information to 802.16e-compliant mobile stations and 802.16m-compliant mobile stations.

In S71, the base station also sends a UL-MAP IE including location information on the CDMA Contention Region for the 802.16e communication region within a frame, to the 802.16e-compliant and 802.16m-compliant mobile stations.

In S72, the base station also sends a UL-MAP IE including location information within a frame in a region in the CDMA Contention Region for the 802.16m communication region, to the 802.16e-compliant and 802.16m-compliant mobile stations.

In S73, an 802.16e-compliant mobile station selects a CDMA code that is to be sent to the base station based on the information indicative of the CDMA code pattern ranges within the UCD message received in S70. For example, when requesting a communication region for transmitting a Bandwidth Request message, the mobile station selects a CDMA code from the range of the Bandwidth Request code in FIG. 33. The 802.16e-compliant mobile station sends the selected CDMA code to the base station in the CDMA Contention Region for the 802.16e communication region.

In S74, an 802.16m-compliant mobile station selects a CDMA code that is to be sent to the base station based on the information indicative of the CDMA code pattern ranges within the UCD message received in S70. For example, when requesting a communication region for transmitting a Bandwidth Request message, the mobile station selects a CDMA code from the range of the Bandwidth Request code in FIG. 33. The 802.16m-compliant mobile station sends the selected CDMA code to the base station in the CDMA Contention Region for the 802.16m communication region.

In S75, the base station generates a CDMA allocation IE for allocating an 802.16e communication region in the UL sub-frame based on the CDMA code received in S73, and sends it to the 802.16e-compliant mobile station.

In S76, the base station generates a CDMA allocation IE for allocating an 802.16m communication region in the UL sub-frame based on the CDMA code received in S74, and sends it to the 802.16m-compliant mobile station.

The 802.16m-compliant mobile station can communicate in both 802.16m and 802.16e communication regions. Thus, an 802.16e communication region may be allocated to the 802.16m-compliant mobile station if there are not sufficient wireless resources of the 802.16m communication region, for example.

Thus, in S76, the base station may generate a CDMA allocation IE for allocating an 802.16e communication region in the UL sub-frame based on the CDMA code received in S74, and may send it to the 802.16m-compliant mobile station.

In S77, the 802.16e-compliant mobile station sends a Bandwidth Request message to the base station in the region in the UL sub-frame, i.e., the 802.16e communication region, allocated using the CDMA allocation IE received in S75.

In S78, the 802.16m-compliant mobile station sends a Bandwidth Request message to the base station in the region in the UL sub-frame, i.e., the 802.16m communication region or 802.16e communication region, allocated using the CDMA allocation IE received in S76.

Figure 35:
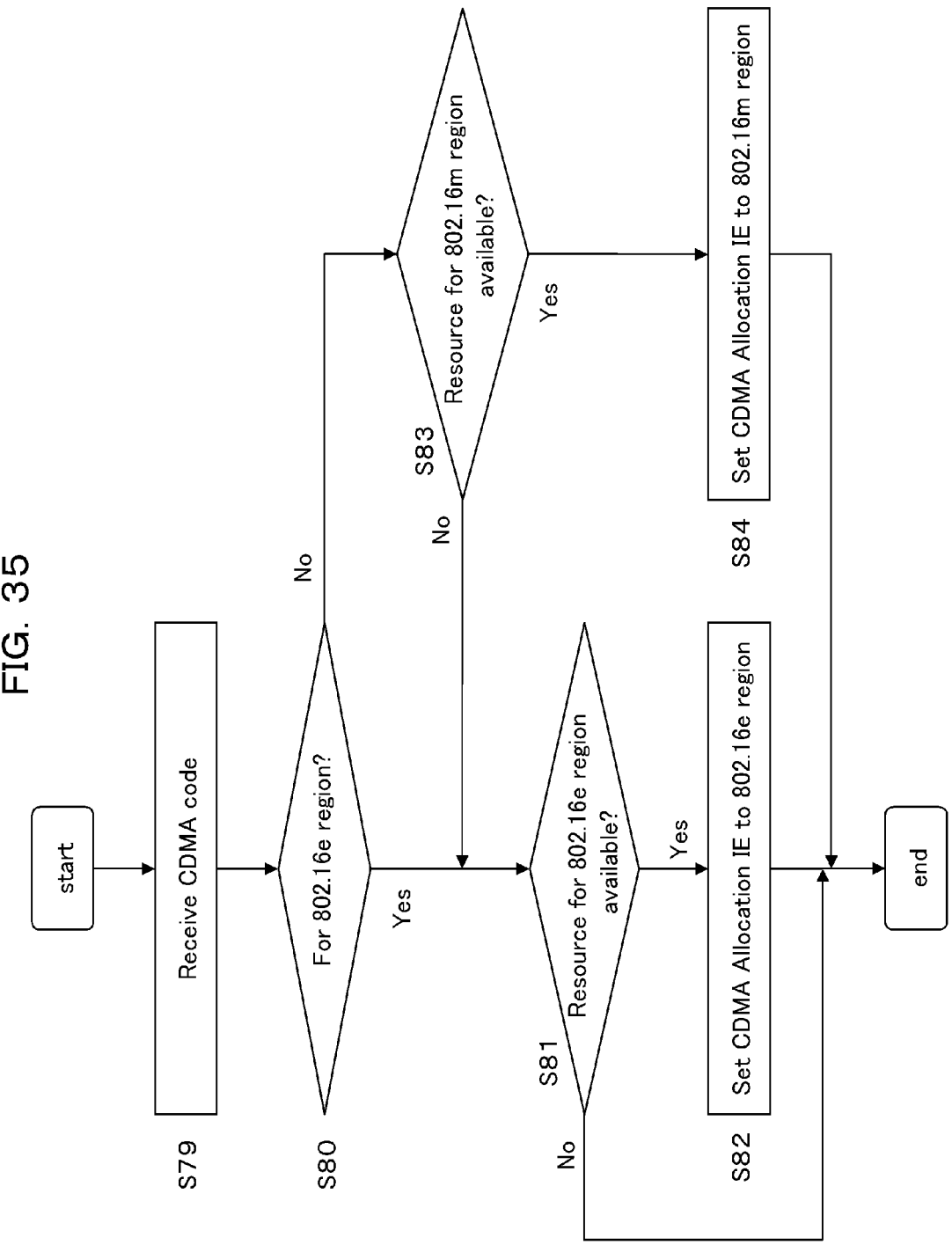
FIG. 35 is a flowchart illustrating an example of a flow for setting a CDMA Allocation IE in the second embodiment.

FIG. 35 is a flowchart illustrating an example of a processing flow upon when a base station receives a CDMA code and sets a CDMA allocation IE to a mobile station that has sent the CDMA code.

In S79, the base station receives a CDMA code.

In S80, the base station determines whether the CDMA code received in S79 is a CDMA code sent in the CDMA Contention Region for the 802.16e communication region. When the code is determined as being a CDMA code sent in the CDMA Contention Region for the 802.16e communication region (when "Yes" in S80), the flow proceeds to S81. When the code is determined as not being a CDMA code sent in the CDMA Contention Region for the 802.16e communication region (when the code is determined as being a CDMA code sent in the CDMA Contention Region for the 802.16m communication region) (when "No" in S80), the flow proceeds to S83.

In S81, a determination is made as to whether wireless resources for the 802.16e communication region are available. When it is determined that there are sufficient wireless resources in the 802.16e communication region (when "Yes" in S81), the flow proceeds to S82. Otherwise, when it is determined that there are not sufficient wireless resources in the 802.16e communication region (when "No" in S81), the processing terminates without setting a CDMA allocation IE.

In S82, a CDMA allocation IE is set for the 802.16e communication region.

In S83, a determination is made as to whether wireless resources for the 802.16m communication region are available. When it is determined that there are sufficient wireless resources in the 802.16m communication region (when "Yes" in S83), the flow proceeds to S84. Otherwise, when it is determined that there are not sufficient wireless resources in the 802.16m communication region (when "No" in S83), the flow proceeds to S81.

In S84, a CDMA allocation IE is set for the 802.16m communication region.

Figure 36:
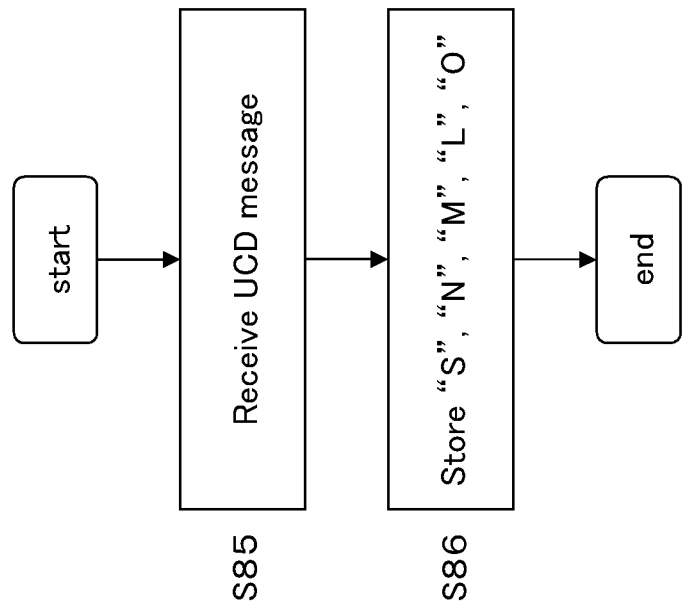
FIG. 36 is a flowchart illustrating an example of a processing flow when a mobile station receives a UCD message in the second embodiment.

FIG. 36 is a flowchart illustrating an example of a processing flow when a mobile station receives a UCD message broadcasted from a base station.

In S85, the mobile station receives a UCD message.

In S86, the mobile station stores information indicative of the CDMA code pattern ranges in the UCD message received in S85, i.e., the values of parameters "S", "N", "M", "L", and "O" are stored (see FIG. 33).

Figure 37:
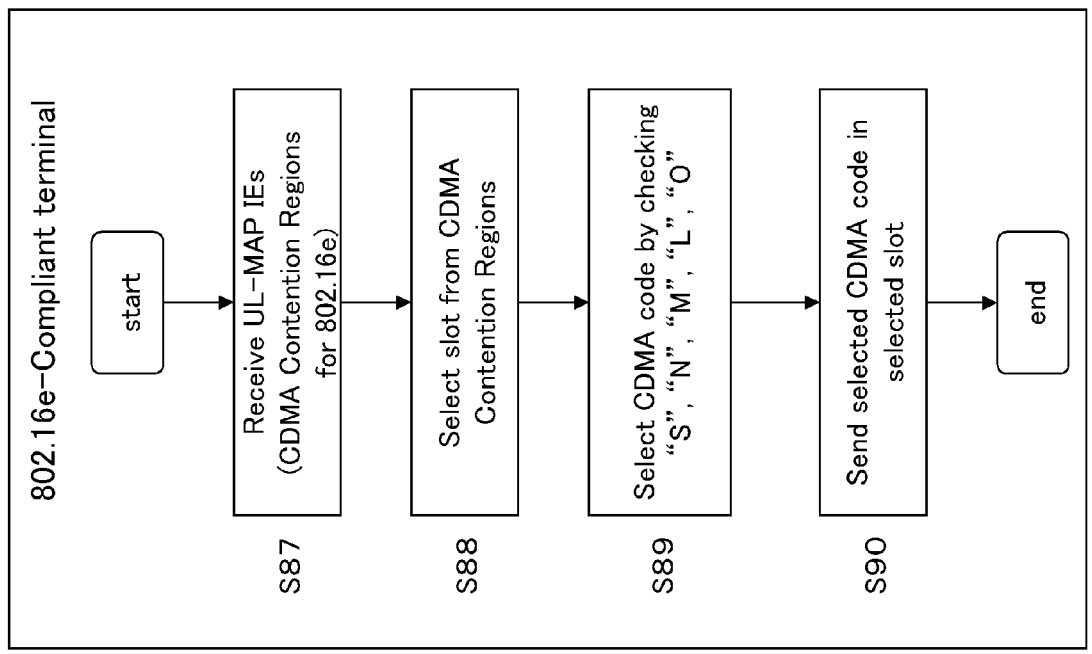
FIG. 37 is a flowchart illustrating an example of a processing flow when an 802.16e-compliant mobile station sends a CDMA code in the second embodiment.
Figure 38:
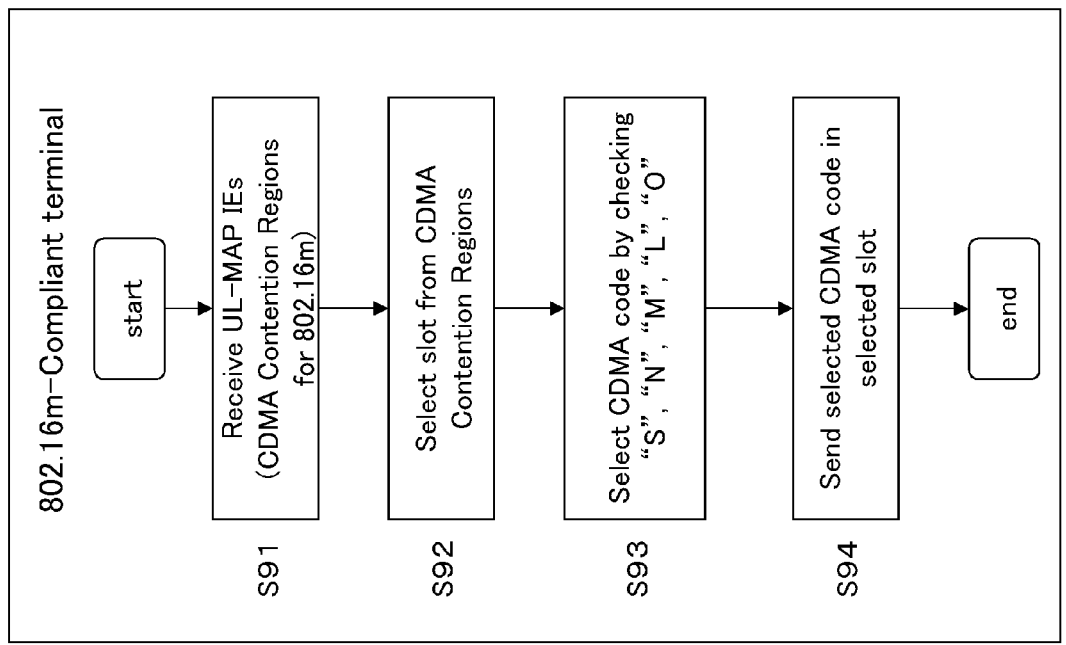
FIG. 38 is a flowchart illustrating an example of a processing flow when an 802.16m-compliant mobile station sends a CDMA code in the second embodiment.

FIGS. 37 and 38 are flowcharts illustrating examples of processing flows when a mobile station sends a CDMA code to the base station.

FIG. 37 illustrates an example of a processing flow when an 802.16e-compliant mobile station sends a CDMA code.

In S87, the mobile station receives a UL-MAP IE. This UL-MAP IE includes location information of a CDMA Contention Region for the 802.16e communication region in which the mobile station can send a CDMA code.

In S88, the mobile station selects a slot from the CDMA Contention Region for the 802.16e communication region specified in the UL-MAP IE received in S87, which the mobile station uses for sending a CDMA code.

In S89, the mobile station selects a CDMA code pattern for sending to the base station, by making reference to the CDMA code pattern range information stored in the mobile station, i.e., the values of the parameters "S", "N", "M", "L", and "O" (see FIG. 33).

In S90, the mobile station sends the CDMA code pattern selected in S89 to the base station, in the slot within the CDMA Contention Region for the 802.16e communication region selected in S88.

FIG. 38 illustrates an example of a processing flow when an 802.16m-compliant mobile station sends a CDMA code.

In S91, the mobile station receives a UL-MAP IE. This UL-MAP IE includes location information of a CDMA Contention Region for the 802.16m communication region in which the mobile station can send a CDMA code.

In S92, the mobile station selects a slot from the CDMA Contention Region for the 802.16m communication region specified in the UL-MAP IE received in S91, which the mobile station uses for sending a CDMA code.

In S93, the mobile station selects a CDMA code pattern for sending to the base station, by making reference to the CDMA code pattern range information stored in the mobile station, i.e., the values of the parameters "S", "N", "M", "L", and "O" (see FIG. 33).

In S94, the mobile station sends the CDMA code of the CDMA code pattern selected in S93 to the base station, in the slot within the CDMA Contention Region for the 802.16m communication region selected in S92.

(5) Variant of Second Embodiment

Figure 39:
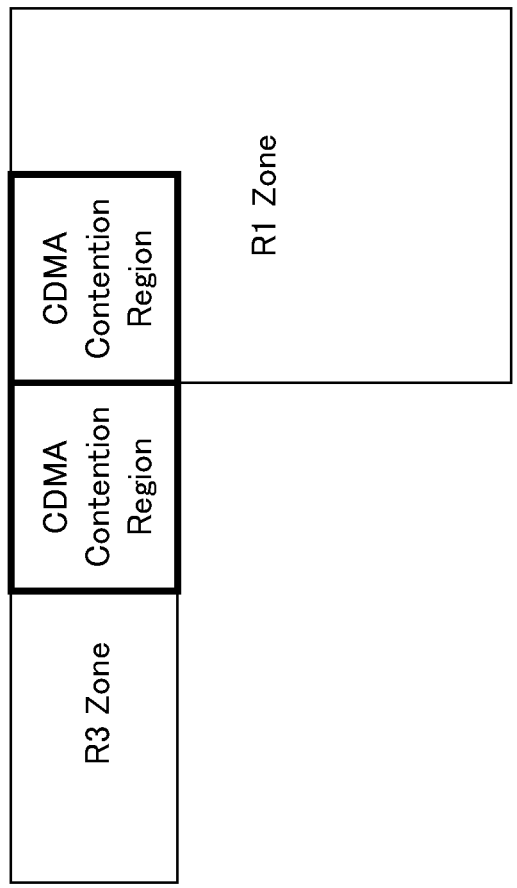
FIG. 39 is a diagram illustrating an example of a UL sub-frame structure used in a variant of the second embodiment.

FIG. 39 illustrates an example of a UL sub-frame structure used in this embodiment. In the present embodiment, as oppose to the frame structure depicted in FIG. 8, corresponding CDMA Contention Regions are for the R3 and R1 Zones.

In the present embodiment, a CDMA code common to the R1 and R3 Zones is used, as in FIG. 33.

Figure 40:
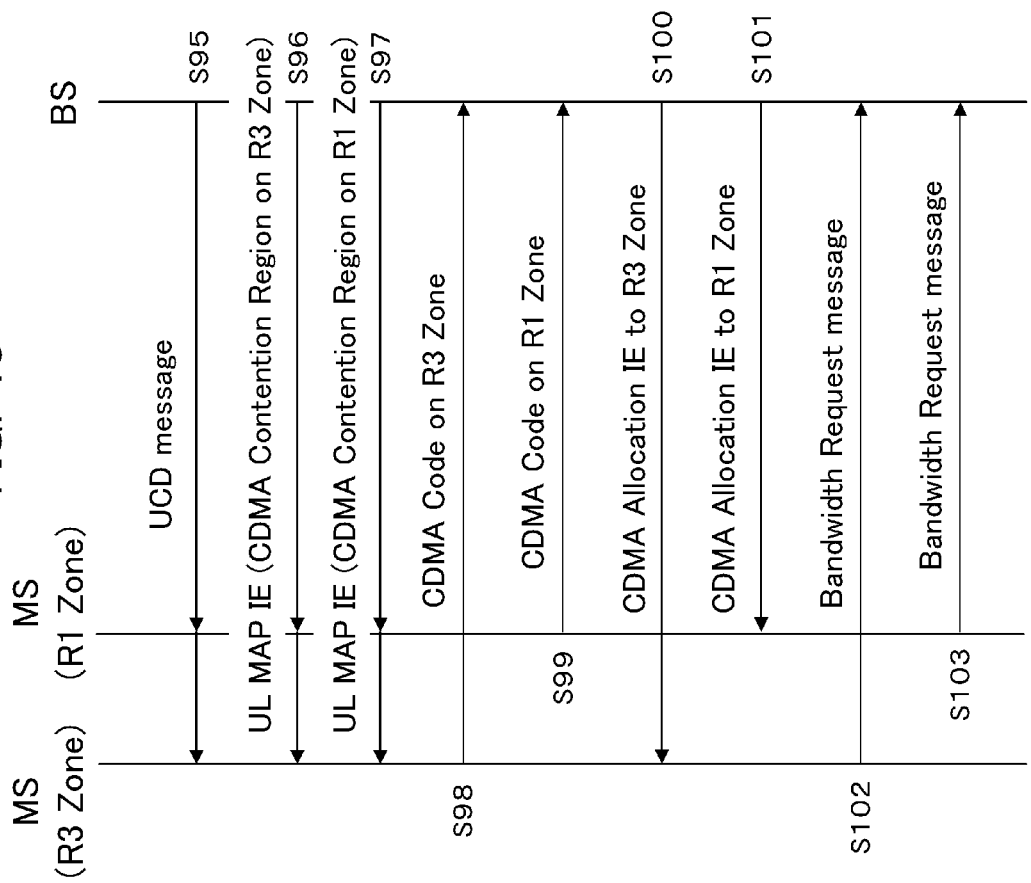
FIG. 40 is a sequence diagram of allocation of a communication region in the variant of the second embodiment.

An example of a sequence when allocating a communication region between a base station and a mobile station is illustrated in FIG. 40.

In S95, the base station sends a UCD message including CDMA code pattern setting information to mobile stations.

In S96, the base station also sends a UL-MAP IE including location information within a frame in a region in the CDMA Contention Region for the R3 Zone, to the mobile stations.

In S97, the base station also sends a UL-MAP IE including location information within a frame in a region in the CDMA Contention Region for the R1 Zone, to the mobile stations.

In S98, an R3 Zone selecting mobile station selects a CDMA code for sending to the base station, based on the information indicative of the CDMA code pattern ranges within the UCD message received in S95. For example, when requesting a communication region for a Bandwidth Request, the mobile station selects a CDMA code from the range of the Bandwidth Request code in FIG. 33. The R3 Zone selecting mobile station sends the selected CDMA code to the base station, in the CDMA Contention Region for the R3 Zone.

In S99, an R1 Zone selecting mobile station selects a CDMA code for sending to the base station, based on the information indicative of the CDMA code pattern ranges within the UCD message received in S95. For example, when requesting a communication region for a Bandwidth Request, the mobile station selects a CDMA code from the range of the Bandwidth Request code in FIG. 33. The R1 Zone selecting mobile station sends the selected CDMA code to the base station, in the CDMA Contention Region for the R1 Zone.

In S100, the base station generates a CDMA allocation IE for allocating an R3 Zone in the UL sub-frame based on the CDMA code received in S98, and sends it to the R3 Zone selecting mobile station.

In S101, the base station generates a CDMA allocation IE for allocating an R1 Zone in the UL sub-frame based on the CDMA code received in S99, and sends it to the R1 Zone selecting mobile station.

The R1 Zone selecting mobile station can communicate in both the R1 and R3 Zones. Thus, an R3 Zone may be allocated to the R1 Zone selecting mobile station if there are not sufficient wireless resources of the R1 Zone, for example.

Thus, in S101, the base station may generate a CDMA allocation IE for allocating an R3 Zone in the UL sub-frame based on the CDMA code received in S99, and may send it to the R1 Zone selecting mobile station.

In S102, the R3 Zone selecting mobile station sends a Bandwidth Request message to the base station in the region in the UL sub-frame, i.e., the R3 Zone, allocated using the CDMA allocation IE received in S100.

In S103, the R1 Zone selecting mobile station sends a Bandwidth Request message to the base station at the region of the UL sub-frame, i.e., the R1 Zone or the R3 Zone, allocated using the CDMA allocation IE received in S101.

Figure 41:
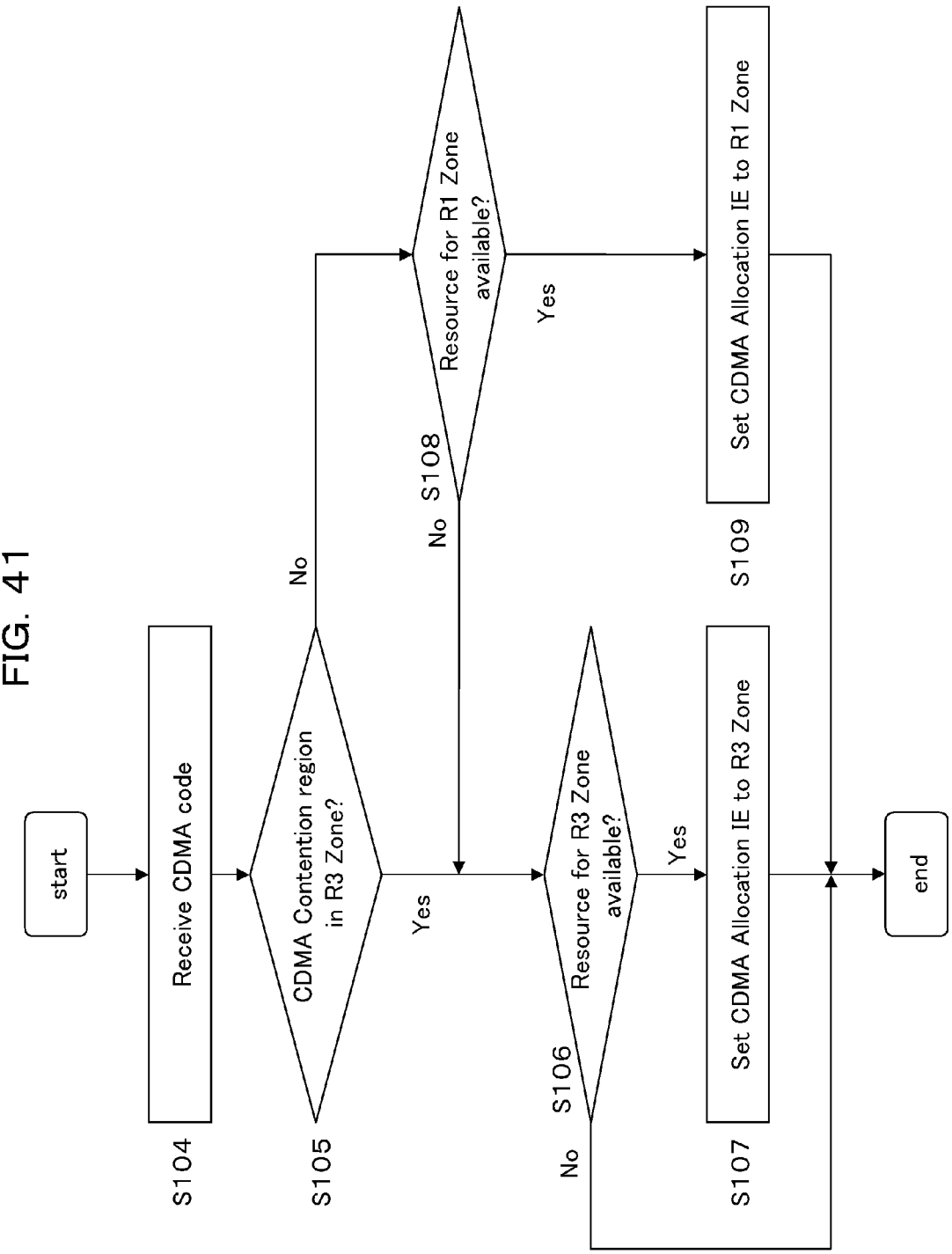
FIG. 41 is a flowchart illustrating an example of a flow for setting a CDMA allocation IE in the variant of the second embodiment.

FIG. 41 is a flowchart illustrating an example of a processing flow upon when a base station receives a CDMA code and sets a CDMA allocation IE to a mobile station that has sent the CDMA code.

In S104, the base station receives a CDMA code.

In S105, the base station determines whether the CDMA code received in S104 is a CDMA code sent in the CDMA Contention Region for the R3 Zone. When the code is determined as being a CDMA code sent in the CDMA Contention Region for the R3 Zone (when "Yes" in S105), the flow proceeds to S106. Otherwise, when the code is determined as not being a CDMA code sent in the CDMA Contention Region for the R3 Zone (when the code is determined as being a CDMA code sent in the CDMA Contention Region for the R1 Zone) (when "No" in S105), the flow proceeds to S108.

In S106, a determination is made as to whether wireless resources for the R3 Zone are available. When it is determined that there are sufficient wireless resources in the R3 Zone (when "Yes" in S106), the flow proceeds to S107. Otherwise, when it is determined that there are not sufficient wireless resources in the R3 Zone (when "No" in S106), the processing terminates without setting a CDMA allocation IE.

In S107, a CDMA allocation IE is set for the R3 Zone.

In S108, a determination is made as to whether wireless resources for the R1 Zone are available. When it is determined that there are sufficient wireless resources in the R1 Zone (when "Yes" in S108), the flow proceeds to S109. Otherwise, when it is determined that there are not sufficient wireless resources in the R1 Zone (when "No" in S108), the flow proceeds to S106.

In S109, a CDMA allocation IE is set for the R1 Zone.

Figure 42:
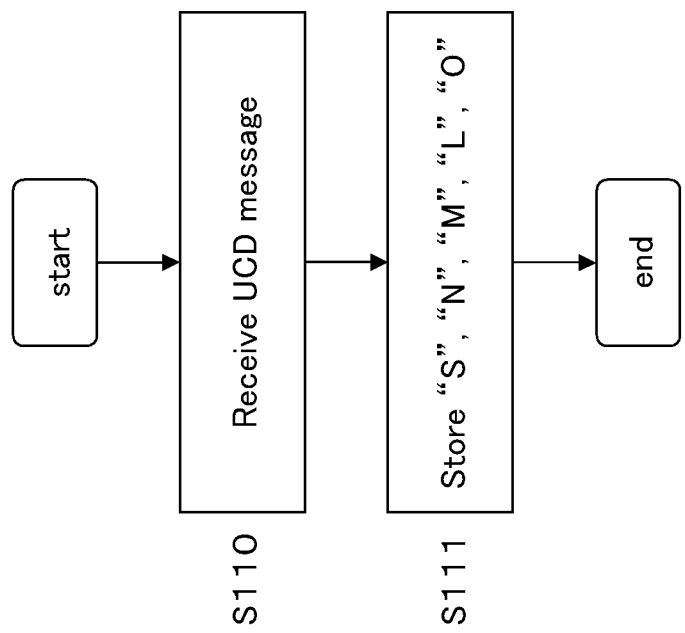
FIG. 42 is a flowchart illustrating an example of a processing flow when a mobile station receives a UCD message in the variant of the second embodiment.

FIG. 42 is a flowchart illustrating an example of a processing flow when a mobile station receives a UCD message broadcasted from a base station.

In S110, the mobile station receives a UCD message.

In S111, the mobile station stores information indicative of the CDMA code pattern ranges in the UCD message received in S110, i.e., the values of parameters "S", "N", "M", "L", and "O" are stored (see FIG. 33).

FIG. 43 is a flowchart illustrating an example of processing flow when a mobile station sends a CDMA code to a base station after receiving UL-MAP IE sent from the base station which specifies the location of CDMA Contention Region.

In S112, the mobile station selects a Zone, which the mobile station uses for sending a CDMA code. A Zone may be selected in the procedure depicted in FIGS. 27, 28, and 31, as described with referent to the variant of the first embodiment.

In S113, a determination is made as to whether the R3 Zone is selected in S112. When the R3 Zone is selected (when "Yes" in S113), the flow proceeds to S114. Otherwise, when the R3 Zone is not selected (the R1 Zone is selected) (when "No" in S113), the flow proceeds to S115.

In S114, the mobile station selects a slot from the CDMA Contention Region for the R3 Zone, which the mobile station uses for sending a CDMA code.

In S115, the mobile station selects a slot from the CDMA Contention Region for the R1 Zone, which the mobile station uses for sending a CDMA code.

In S116, the mobile station selects a CDMA code pattern for sending to the base station, by making reference to the CDMA code pattern range information stored in the mobile station, i.e., the values of the parameters "S", "N", "M", "L", and "O" (see FIG. 33).

In S117, the mobile station sends the CDMA code pattern selected in S116 to the base station, in the slot within the CDMA Contention Region for the R3 Zone or the R1 Zone selected in S114 or S115.

(6) Others

Allocation of a communication region in the UL sub-frame for sending a Bandwidth Request message from a mobile station has been explained in the above-described embodiments, applicable messages are not limited to Bandwidth Request messages. For example, any other communication regions may be allocated for sending other messages, such as a Ranging Request message in the Initial Ranging.

Furthermore, a base station determines a communication region to be allocated to a mobile station based on a CDMA code sent from the mobile station in the above-described embodiments. However, the base station may store communication region (e.g., 802.16e or 802.16m communication region) to be allocated to a mobile station, from which a CDMA code has been received, and may subsequently allocate a communication region using the information.

In accordance with the embodiments, efficient allocation of wireless resources to mobile stations having different capacities or in different wireless environments or the like is attained in a wireless communication system wherein multiple communication regions can be set in a wireless frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A method for allocating a wireless resource, wherein a mobile station communicating by use of a second communication region compliant with a second communication standard is also operable as a mobile station communicating by use of a first communication region compliant with a first communication standard, the method comprising:

allocating, when a code received by a base station from a mobile station is a first code included in a predetermined code group, a wireless resource in the first communication region to the mobile station, and when the received code is a second code not included in the predetermined code group, allocating a wireless resource in the second communication region to the mobile station when the wireless resource in the second communication region is allocatable to the mobile station, while allocating the wireless resource in the first communication region to the mobile station when the wireless resource in the second communication region is not allocatable to the mobile station.

2. A method for allocating a wireless resource, wherein a mobile station communicating by use of a fourth communication region compliant with a third communication standard is also operable as a mobile station communicating by use of a second communication region compliant with a first communication standard, the method comprising:
   allocating, when a code received by a base station from a mobile station is a code received in a first communication region, a wireless resource in the second communication region to the mobile station, and
   when the received code is a code received in a third communication region,
      allocating a wireless resource in the fourth communication region to the mobile station when the wireless resource in the fourth communication region is allocatable to the mobile station,
      while allocating a wireless resource in the second communication region to the mobile station when the wireless resource in the fourth communication region is not allocatable to the mobile station.

3. The method for allocating a wireless resource according to claim 1, wherein:
   the mobile station selects a code to be sent to the base station in accordance with a wireless environment between the mobile station and the base station.

4. A base station connected to a first mobile station communicating only by use of a first communication region compliant with a first communication standard and a second mobile station communicating by use of the first communication region and a second communication region compliant with a second communication standard, the base station comprising:
   a reception section that receives a code; and
   a control section that controls to:
      allocate, when receiving a first code included in a predetermined code group by the reception section from the first mobile station, a wireless resource in the first communication region corresponding to the first code to the first mobile station, and
      when receiving a second code not included in the predetermined code group by the reception section from the second mobile station,
         allocate a wireless resource in the second communication region corresponding to the second code to the second mobile station when the wireless resource in the second communication region is allocatable to the second mobile station,
         while allocate the wireless resource in the first communication region to the second mobile station when the wireless resource in the second communication region is not allocatable to the second mobile station.

5. The base station according to claim 4, wherein the control section allocates a wireless resource in the first communication region to the second mobile station even when the second code is received from the second mobile station, when a wireless resource in the second communication region is not sufficient.

6. A base station connected to a first mobile station communicating only by use of a second communication region compliant with a first communication standard and a second mobile station communicating by use of the first communication region and a fourth communication region compliant with a second communication standard, the base station comprising:
   a reception section that receives a code; and
   a control section that controls to:
      allocate, when a received code is a code received by the reception section in a first communication region, a wireless resource in the second communication region corresponding to the first communication region to a mobile station, and
      when the received code is a code received by the reception section in a third communication region,
         allocate a wireless resource in the fourth communication region corresponding to the third communication region to the mobile station when the wireless resource in the fourth communication region is allocatable to the mobile station,
         while allocate a wireless resource in the second communication region to the mobile station when the wireless resource in the fourth communication region is not allocatable to the mobile station.

7. The base station according to claim 6, wherein the control section allocates the wireless resource in the second communication region to the mobile station that sends the received code even when the received code is a code received in the third communication region, when a wireless resource in the fourth communication region is not sufficient.

8. A mobile station, comprising:
   a transmission section that sends, to a base station, a code compliant with a second communication standard which the mobile station is compliant with;
   a reception section that receives, from the base station, allocation information of a wireless resource in a second communication region corresponding to a second type of the code when the wireless resource in the second communication region is allocatable to the mobile station, and receives allocation information of a wireless resource in a first communication region corresponding to a first type of a code different from the second type of the code when the wireless resource in the second communication region is not allocatable to the mobile station, the first communication region and the second communication region compliant with a first communication standard and the second communication standard, respectively; and
   a control section that controls the transmission section in accordance with the received allocation information for transmitting a wireless signal using the wireless resource.

9. A mobile station, comprising:
   a transmission section that sends a code compliant with a second communication standard to a base station;
   a reception section that receives, from the base station, allocation information of a wireless resource in a second communication region corresponding to a first communication region, in which a first code is sent, when the wireless resource in the second communication region is allocatable to the mobile station, and receives allocation information of a wireless resource in a fourth communication region corresponding to a third communication region, in which a second code is sent, different from the first communication region when the wireless resource in the second communication region is not allocatable to the mobile station, the second communication region and the fourth communication region compliant with a first communication standard and the second communication standard, respectively; and
a control section that controls the transmission section in accordance with the received allocation information for transmitting a wireless signal using the wireless resource.

* * * * *